United States Patent
Okada et al.

(10) Patent No.: US 7,974,581 B2
(45) Date of Patent: Jul. 5, 2011

(54) TRANSMITTER

(75) Inventors: Takashi Okada, Kodaira (JP); Jun Watanabe, Kodaira (JP); Takahiro Todate, Kodaira (JP); Norio Hasegawa, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 667 days.

(21) Appl. No.: 12/068,926

(22) Filed: Feb. 13, 2008

(65) Prior Publication Data

US 2008/0200126 A1    Aug. 21, 2008

(30) Foreign Application Priority Data

Feb. 15, 2007 (JP) ................................. 2007-034955

(51) Int. Cl.
*H04B 1/68* (2006.01)

(52) U.S. Cl. .................... 455/46; 455/114.2; 455/114.3; 455/126; 375/260

(58) Field of Classification Search .................... 455/46, 455/114.2, 114.3, 126; 375/260
See application file for complete search history.

(56) References Cited

U.S. PATENT DOCUMENTS

| | | | | |
|---|---|---|---|---|
| 5,675,287 A | * | 10/1997 | Baker et al. | 330/129 |
| 6,931,343 B2 | * | 8/2005 | Webster et al. | 702/107 |
| 7,796,687 B1 | * | 9/2010 | Anvari | 375/232 |

* cited by examiner

*Primary Examiner* — Sanh D Phu
(74) *Attorney, Agent, or Firm* — Wenderoth, Lind & Ponack, L.L.P.

(57) ABSTRACT

A transmitter suppresses a peak level of a multi-carrier signal produced by synthesizing a plurality of carrier signals. Specifically, a peak level suppression signal for a multi-carrier signal is generated. The generated peak level suppression signal is adjusted in accordance with the levels of respective carriers constituting the multi-carrier signal. And, the adjusted peak level suppression signal for each carrier is subtracted from an input signal, thereby generating a multi-carrier signal whose peak level is suppressed.

5 Claims, 18 Drawing Sheets

| Level difference between f1 and f2 | EVM[%] | | PCDE[dB] | |
| --- | --- | --- | --- | --- |
| | f1 | f2 | f1 | f2 |
| Equal level | 9.07 | 8.67 | -36.00 | -36.51 |
| Difference of 12 dB | 8.43 | 6.60 | -35.32 | -38.04 |

| Level difference between f1 and f2 | EVM[%] | | PCDE[dB] | |
|---|---|---|---|---|
| | f1 | f2 | f1 | f2 |
| Equal level | 9.45 | 9.14 | -35.19 | -35.26 |
| Difference of 12 dB | 8.61 | 12.56 | -35.34 | -32.95 |

TRANSMITTER

BACKGROUND OF THE INVENTION

1. Field of the Invention

The present invention relates to transmitters for mobile communication systems, in which methods such as W-CDMA (Wideband-Code Division Multiple Access) and/or OFDM (Orthogonal Frequency Division Multiplexing), for example, are/is used, and in particular relates to a transmitter that detects and suppresses the peak power of a multi-carrier transmission signal.

2. Description of the Background Art

FIG. 16 shows an example of an internal configuration of a peak power suppression means 301.

As shown in Eq. (1), for example, a power calculation means 313 calculates, from I-phase (In-phase) and Q-phase (Quadrature-phase) components of an input signal, an instantaneous power value for each sample.

$$\text{Instantaneous Power} = (I\text{-Phase Component})^2 + (Q\text{-Phase Component})^2 \qquad \text{Eq. (1)}$$

A peak power detection means 314 compares a power value of an input signal with a threshold power for each sample to determine, as a peak power, the sample having a power value greater than the threshold power. As a result of this comparison, when the peak power is determined, the peak power detection means 314 outputs the power value of the peak power, and when no peak power is determined, the peak power detection means 314 outputs 0 data. If the threshold power is set at a low level, the peak power might occur continuously for several samples; therefore, when only the maximum of the continuous peak powers is regarded as an object to be suppressed, excessive suppression can be prevented.

It should be noted that in this example, the peak is detected using power value, but the peak is equally detected even if the square root thereof is taken and amplitude value is used.

A peak power suppression rate calculation means 315 determines the ratio between the peak power and the threshold power, and calculates a rate at which the peak power is suppressed to the level of the threshold power. In this example, the peak power is suppressed by subtracting an amplitude component exceeding the threshold value from a transmission signal, and therefore, the peak power suppression rate is calculated as shown in Eq. (2).

$$\text{Peak Power Suppression Rate} = 1 - \sqrt{\frac{\text{Threshold Power}}{\text{Peak Power}}} \qquad \text{Eq. (2)}$$

A delay adjustment means 312 supplies the IQ components of the input signal with delays equivalent to process delays, which occur at the power calculation means 313, the peak power detection means 314 and the peak power suppression rate calculation means 315.

Multipliers 321, 322 constituting a multiplication means 316 multiply the delay-adjusted IQ components of the input signal at the time of peak detection by the peak power suppression rate, and generate a peak power suppression signal that is a suppression amplitude component of the peak power.

A filter coefficient generation means 318 generates, based on carrier frequency information of the transmission signal, a filter coefficient having a frequency characteristic for limiting the frequency band of the peak power suppression signal to a desired frequency band. The frequency band of the peak power suppression signal is preferably similar to that of the transmission signal or preferably falls within the frequency band of the transmission signal in terms of the quality of spectrum waveform. It should be noted that the filter coefficient generated in this example is normally in the form of a complex coefficient in order to cope with any carrier frequency.

A complex multiplication means 317 complex-multiplies the peak power suppression signal by the filter coefficient, and outputs the peak power suppression signal whose band has been limited to a desired frequency band. In the case of using a W-CDMA method, for example, this complex multiplication is performed as shown in Eq. (3).

$$I' = I \times \text{Coef\_Re} - Q \times \text{Coef\_Im}$$

$$Q' = Q \times \text{Coef\_Re} + I \times \text{Coef\_Im} \qquad \text{Eq. (3)}$$

※I: I-phase component of Multiplication means 316 output signal

Q: Q-phase component of Multiplication means 316 output signal

I': I-phase of complexmultiplication means 317 output signal

Q': Q-phase of complexmultiplication means 317 output signal

Coef_Re: real part of filter coefficient

Coef_Im: imaginary part of filter coefficient

As methods for band-limiting the peak power suppression signal in the complex multiplication means 317, two circuit implementation methods will be described below.

In a first method, an FIR filter is used. Since the filter coefficient is a complex coefficient, a filter operation is performed by convolution of complex multiplication.

Next, a second method will be described.

By limiting the peak power, serving as an object to be suppressed, to the maximum of continuous peak powers or to the maximum of peak powers during a certain sample interval in order to prevent excessive suppression as described above, the degradation in signal quality of the transmission signal after peak power suppression is reduced. In this case, the peak power suppression signal will be one in which a single impulse occurs during a certain interval.

FIG. 17 shows an example of time waveform in the case where samples, in each of which instantaneous power exceeds a set threshold value, are all detected as peak powers. The horizontal axis represents sample, while the vertical axis represents peak suppression signal power value.

FIG. 18 shows an example of time waveform in the case where a peak power, which is the maximum power during an interval of 50 samples, is extracted as a peak power serving as an object to be suppressed. The horizontal axis represents sample, while the vertical axis represents peak suppression signal power value.

Thus, even if no FIR filter is configured for a peak power suppression signal in which a peak power serving as the single maximum power during a certain interval is extracted as shown in FIG. 19, a peak suppression amplitude component is extended to a sample length equivalent to a table width (equal to the number of taps), in which a filter coefficient is stored, and is complex-multiplied by the filter coefficient for each sample, thereby obtaining a peak power suppression signal whose band is limited so as to be equivalent to that obtained when it is passed through an FIR filter.

In an FIR filter, due to a convolution operation, multipliers are required in accordance with the number of taps, but in the second band limitation implementing method shown in FIG.

19, the number of multipliers to be used is only four, which is required for complex multiplication, thus effectively preventing an increase in circuit size.

A delay adjustment means 311 supplies the IQ components of the input signal with delays equivalent to process delays, which occur along a path leading from the power calculation means 313 to the complex multiplication means 317.

Subtracters 323, 324, constituting a subtraction means 319, subtract the peak power suppression signal from the transmission signal for each of I phase and Q phase, and outputs the transmission signal whose peak power has been suppressed.

Hereinafter, an exemplary procedure of filter coefficient generation in the filter coefficient generation means 318 will be described in detail.

In a peak power suppression means according to an embodiment of the present invention described later, it is assumed that peak power suppression is performed on an IF (Intermediate Frequency) signal produced by multi-carrier synthesis, the frequency band of this input signal varies depending on the number of carriers and carrier frequency, and a filter coefficient for controlling the frequency band of the peak power suppression signal has to be changed to an optimum one in accordance with the frequency band of the transmission signal.

A filter coefficient associated with an IF signal can be generated by complex-multiplying the filter coefficient for a base band 1 carrier signal (in the case of a W-CDMA signal, a pass band width is 5 MHz, and a center frequency of the pass band is 0 MHz) by the carrier frequency. Next, the procedure of generating a filter coefficient associated with arbitrary carrier setting from a filter coefficient for the base band 1 carrier signal will be described.

The filter coefficient associated with the base band 1 carrier signal is normally not a complex coefficient but is a real coefficient. This is because the carrier frequency is 0 MHz which is a special case, and since the phase is not rotated, the phase is fixed at 0 degree, thus allowing the imaginary part of the filter coefficient to be 0. The filter coefficient "tap [k]" for the base band 1 carrier signal is defined by Eq. (4). In this equation, the number of taps for the filter is indicated by "L", which is odd number.

$$\{tap[k] | -(L-1)/2 \leq k \leq +(L-1)/2\} \qquad \text{Eq. (4)}$$

The pass band of the filter having the filter coefficient defined by Eq. (4) is frequency-changed by f1 ($=\omega 1/2\pi$) [MHz]. The complex filter coefficient after the frequency change is defined by Eq. (5).

$$\{(tapRe2[k], tapIm1[k]) | -(L-1)/2 \leq k \leq +(L-1)/2\} \qquad \text{Eq. (5)}$$

The filter coefficient, which has been frequency-changed by f1 ($=\omega 1/2\pi$) [MHz], is determined by Eq. (6) and Eq. (7).

$$TapRe1[k] = tap[k] \times \cos(\omega 1 \cdot t + \theta) \text{ where } -(L-1)/2 \leq k \leq +(L-1)/2 \qquad \text{Eq. (6)}$$

$$tapIm1[k] = tap[k] \times \sin(\omega 1 \cdot t + \theta) \text{ where } -(L-1)/2 \leq k \leq +(L-1)/2 \qquad \text{Eq. (7)}$$

Since it is a digital region, time t fluctuates with a time width per sample. θ is a phase offset, and in order to suitably suppress the peak power, θ has to be determined so that the following equation: ($\omega 1 \cdot t + \theta = 0$) is established at a center position of the filter coefficient, i.e., at k=0.

Next, the procedure of generating a filter coefficient having a pass band for a plurality of carriers by multi-carrier transmission of two or more carriers will be described.

The filter coefficient for the filter with a frequency fn($=\omega n/2\pi$) is defined by Eq. (8).

$$\{(tapRen[k], tapImn[k]) | -(L-1)/2 \leq k \leq +(L-1)/2\} \qquad \text{Eq. (8)}$$

The filter coefficients obtained by synthesizing all the filters associated with frequencies f1, f2, . . . , fn are represented by Eq. (9) and Eq. (10).

$$tapRe[k] = tapRe1[k] + tapRe2[k] + \ldots + tapRen[k]$$
$$\text{where } -(L-1)/2 \leq k \leq +(L-1)/2 \qquad \text{Eq. (9)}$$

$$tapIm[k] = tapIm1[k] + tapIm2[k] + \ldots + tapImn[k]$$
$$\text{where } -(L-1)/2 \leq k \leq +(L-1)/2 \qquad \text{Eq. (10)}$$

In the case of synthesizing a plurality of filter coefficients, gain adjustment has to be carried out. For example, in the case of synthesizing filter coefficients for two carriers, the synthesized filter coefficient is multiplied by ½, and gain is kept constant regardless of the number of carriers.

With the above-described procedures, filter coefficients associated with any number of carriers and carrier frequency can be generated. However, if carrier setting for a transmission signal is limited to a finite pattern, filter coefficients associated with all the transmittable carrier settings may be stored in a memory in advance, and a filter coefficient may be selected in accordance with frequency information of the transmission signal.

Next, FIG. 23 shows, as an exemplary configuration of the filter coefficient generation means 318, an exemplary configuration of a filter coefficient generation means 318a.

In this example, filter coefficient storage parts J1 to Jn associated with a plurality of, i.e., an n number of, carriers 1 to n, respectively, store filter coefficients having frequency characteristics associated with respective transmission carriers.

An addition part 331 adds I phase components of filter coefficients outputted from the n number of the filter coefficient storage parts J1 to Jn, and outputs the added result as the coefficient of the I phase.

An addition part 332 adds Q phase components of filter coefficients outputted from the n number of the filter coefficient storage parts J1 to Jn, and outputs the added result as the coefficient of the Q phase.

Next, two examples of problems that occur in a peak power suppression means according to a conventional technology will be described using results of calculator simulation with a W-CDMA signal.

These examples of problems can occur by multi-carrier transmission of two or more carriers. However, in the following description, for the sake of simplicity, a transmission signal is transmitted by two-carrier transmission, and when the level between carriers is set in an unbalanced manner, a carrier f1 and a carrier f2 are set so that the carrier f1 is always at a higher level. In the calculator simulation, the carrier frequency was set at f1: −2.5 [MHz], and f2: +2.5 [MHz].

(i) Problem Example 1

At the time of two-carrier transmission, the filter coefficient has a pass band for two carriers; however, even if a level difference exists between the carriers of a transmission signal, the peak power suppression signal is kept at a constant level within the pass band.

FIG. 20 shows examples of frequency spectra of a transmission signal (i.e., an input signal of the peak power suppression means 301) and a peak power suppression signal (i.e., an output signal of the complex multiplication means 317) when the level difference between the carrier f1 and the carrier f2 is set at 12 dB. The horizontal axis represents frequency [MHz], while the vertical axis represents level [dB].

It can be confirmed that in the transmission signal, a level difference exists between the carriers, but in the peak power suppression signal, no level difference exists between the carriers. In this case, since the level difference between the transmission signal and the peak power suppression signal is small in the carrier f2, the signal quality within the band of the carrier f2 is significantly degraded as compared with that within the band of the carrier f1.

For example, in the case of a W-CDMA signal, the signal quality within the band is measured by EVM (Error Vector Magnitude), and/or PCDE (Peak Code Domain Error), but until the level of transmission power Pmax−18 [dB] (Pmax: maximum transmission power), EVM and/or PCDE standard(s) must be satisfied. Therefore, if the level unbalance between the carriers is taken into consideration, the peak power cannot be suppressed to a low level in order to satisfy the signal quality standard within the transmission band.

A table in FIG. 22 shows a summary of EVM and PCDE characteristics with respect to output signals of the peak power suppression means 301 according to the conventional technology.

As signals serving as objects to be evaluated, there are provided signals of two patterns, characteristics of which are obtained when the carrier f1 and the carrier f2 are at an equal level, and when a level difference therebetween is 12 dB. In either signal pattern, level adjustment is performed so that the total transmission power is kept constant at Pmax at a preceding stage of the peak power suppression means 301, and furthermore, peak detection threshold values are set at an equal level, thus making the suppressed amount of the peak power equal.

According to the characteristics shown in the table of FIG. 22, when the two carriers are at an equal level, 3GPP standard (EVM: 12.5 [%], and PCDE: −33 [dB]) is satisfied with a sufficient margin, but when there is a level unbalance, the characteristic of the low-level carrier f2 is degraded more significantly than that of the carrier f1, and does not measure up to the standard.

(ii) Problem Example 2

At the time of two-carrier transmission, if the level of the carrier f2 is extremely low (for example, if the power of f2 is Pmax−50 dB) or if the carrier f2 had a burst interval for a certain period of time (it is to be noted that frequency information is maintained at transmission state even during burst period), a peak power suppression signal might be produced at a higher level than the carrier.

FIG. 21 shows exemplary frequency spectra of a transmission signal (i.e., an input signal of the peak power suppression means 301) and a peak suppression signal (i.e., an output signal of the complex multiplication means 317) when the level difference between the carrier-f1 and the carrier f2 is set at 50 dB. The horizontal axis represents frequency [MHz], while the vertical axis represents level [dB].

It can be confirmed that in the carrier f2, the peak power suppression signal is produced at a higher level than the transmission signal.

See Japanese Unexamined Patent Application Publication No. 2005-20505.

For example, execution of peak power suppression on a transmission signal in a transmitting amplifier is an important technique for reducing the ratio of the peak power of the transmission signal to average power (PAPR: Peak to Average Power Ratio) and for decreasing the back-off of a power amplifier to increase the power efficiency thereof. Furthermore, if the PAPR of an input signal of a power amplifier is low, a power amplifier with a low saturation level can accordingly be used, which leads to the cost reduction of the power amplifier.

In the methodology for limiting the band of a peak power suppression signal to a frequency band similar to that of the transmission signal as described above, the degradation in spectrum waveform is very small, and the signal quality measured by EVM, PCDE or the like is lower compared with other peak power suppression methods, thus making it possible to reduce the PAPR to a lower level while satisfying the standard such as 3GPP. However, if a level difference exists between carriers in multi-carrier transmission as mentioned above, there have been caused problems that signal quality is significantly degraded and distortion is found in a burst interval.

Thus, according the conventional technology, a peak power suppression signal has been generated for a multi-carrier signal regardless of a level difference between carriers. Therefore, in the case where a level difference exists in a transmission carrier signal or in the case of a burst signal in which a carrier during an interval is not transmitted, there have been caused problems that the level of the peak power suppression signal becomes high with respect to the carrier signal, and radio specification cannot be satisfied.

SUMMARY OF THE INVENTION

The present invention has been made in view of these conventional circumstances, and its object is to provide a transmitter capable of maintaining a high signal quality for any transmission signal pattern in detecting and suppressing the peak power of a multi-carrier transmission signal.

To achieve the above object, an transmitter according to the present invention suppresses the peak level of a multi-carrier signal, produced by synthesizing a plurality of carrier signals, with the following configuration.

Specifically, a suppression signal generation means generates a peak level suppression signal having a level according to levels of respective carrier signals for frequencies of the respective carrier signals contained in the multi-carrier signal. A suppression signal subtraction means subtracts, from the multi-carrier signal, the peak level suppression signal generated by the suppression signal generation means.

Therefore, in consideration of levels of respective carrier signals contained in a multi-carrier signal serving as an object for peak level suppression, the peak level of the multi-carrier signal is suppressed, thus allowing favorable peak level suppression to be performed. For example, in detecting and suppressing the peak power of a multi-carrier transmission signal, it is possible to maintain a high signal quality for any transmission signal pattern.

In this configuration, various numbers may be used as the number of a plurality of carrier signals.

Further, a means for generating a multi-carrier signal by synthesizing a plurality of carrier signals may be provided.

Furthermore, the peak level of a signal may be detected by various methods. For example, it is possible to use an aspect that detects, as a peak portion, a signal portion having a level exceeding a predetermined threshold value.

Moreover, as the level of a signal, the level of power and/or the level of amplitude, for example, may be used.

In addition, as a peak level suppression signal having a level according to levels of respective carrier signals for frequencies of the respective carrier signals, it is possible to use a signal in which the higher the levels of respective carrier signals, the higher the frequency levels of the respective carrier signals, and the lower the levels of respective carrier signals, the lower the frequency levels of the respective carrier signals.

Besides, as a signal, a complex signal including an I phase component and a Q phase component, for example, can be used. In that case, as an operation, a complex operation is performed, and when necessary, a filter coefficient including a complex value (I phase component and Q phase component) is used.

In the transmitter according to the present invention, as a configuration example, the suppression signal generation means is configured as follows.

Specifically, in the suppression signal generation means, a coefficient multiplication means multiplies, for each of carrier signals contained in the multi-carrier signal, a filter coefficient associated with each of the carrier signals. A summing means sums, for all the carrier signals contained in the multi-carrier signal, multiplied results obtained by the coefficient multiplication means. A suppression rate generation means generates a peak level suppression rate based on the multi-carrier signal. A suppression rate multiplication means multiplies the summed result or a signal serving as a basis for obtaining the summed result by the peak level suppression rate generated by the suppression rate generation means so that the summed result obtained by the summing means is multiplied by the peak level suppression rate generated by the suppression rate generation means. Furthermore, a result of these operations (i.e., a signal produced by multiplying the summed result obtained by the summing means by the peak level suppression rate generated by the suppression rate generation means) provides a peak level suppression signal.

Therefore, using each carrier signal itself, it is possible to generate a peak level suppression signal with consideration given to the level of each carrier signal.

In this configuration example, as the filter coefficient associated with each carrier signal, a filter coefficient associated with the frequency of each carrier signal, for example, may be used.

Further, as the peak level suppression rate, various values may be used; for example, a value for suppressing the peak level to a predetermined threshold level may be used.

Furthermore, as the signal to be multiplied by the peak level suppression rate, various signals may be used; for example, a summed result obtained by the summing means may be used, or as the signal serving as a basis for obtaining the summed result, each carrier signal, a filter coefficient associated with each carrier signal, a result obtained by multiplying each carrier signal by a filter coefficient, or the like may be used.

In the transmitter according to the present invention, as another configuration example, the suppression signal generation means is configured as follows.

Specifically, in the suppression signal generation means, a coefficient generation means generates, for each of carrier signals contained in the multi-carrier signal, a filter coefficient associated with the level of each of the carrier signals. A coefficient summing means sums, for all the carrier signals contained in the multi-carrier signal, filter coefficients generated by the coefficient generation means. A signal multiplication means multiplies a summed result obtained by the coefficient summing means (i.e., a summed result of filter coefficients) by the multi-carrier signal. A suppression rate generation means generates a peak level suppression rate based on the multi-carrier signal. A suppression rate multiplication means multiplies the multiplied result or a signal serving as a basis for obtaining the multiplied result by the peak level suppression rate generated by the suppression rate generation means so that the multiplied result obtained by the signal multiplication means is multiplied by the peak level suppression rate generated by the suppression rate generation means. Furthermore, a result of these operations (i.e., a signal produced by multiplying the multiplied result obtained by the signal multiplication means by the peak level suppression rate generated by the suppression rate generation means) provides a peak level suppression signal.

Therefore, by detecting the level of each carrier signal, for example, it is possible to generate a peak level suppression signal with consideration given to the level of each carrier signal.

In this configuration example, as a method for detecting the level of each carrier signal, various methods may be used; for example, an aspect for detecting the level of each carrier signal before being synthesized with a multi-carrier signal, or an aspect for detecting the level of each carrier signal by Fourier-transforming a multi-carrier signal may be used.

Further, as the peak level suppression rate, various values may be used; for example, a value for suppressing the peak level to a predetermined threshold level may be used.

Furthermore, as the signal to be multiplied by the peak level suppression rate, various signals may be used; for example, a multiplied result obtained by the signal multiplication means may be used, or as the signal serving as a basis for obtaining the multiplied result, each carrier signal, a filter coefficient associated with each carrier signal, a summed result of filter coefficients, a multi-carrier signal or the like may be used.

As described thus far, according to the present invention, in consideration of levels of respective carrier signals contained in a multi-carrier signal serving as an object for peak level suppression, the peak level of the multi-carrier signal is suppressed, thus allowing favorable peak level suppression to be performed. For example, in detecting and suppressing the peak power of a multi-carrier transmission signal, it is possible to maintain a high signal quality for any transmission signal pattern.

DESCRIPTION OF THE INVENTION

Hereinafter, embodiments according to the present invention will be described with reference to the accompanied drawings.

Embodiment 1

A first embodiment of the present invention will be described below.

Figure 1:
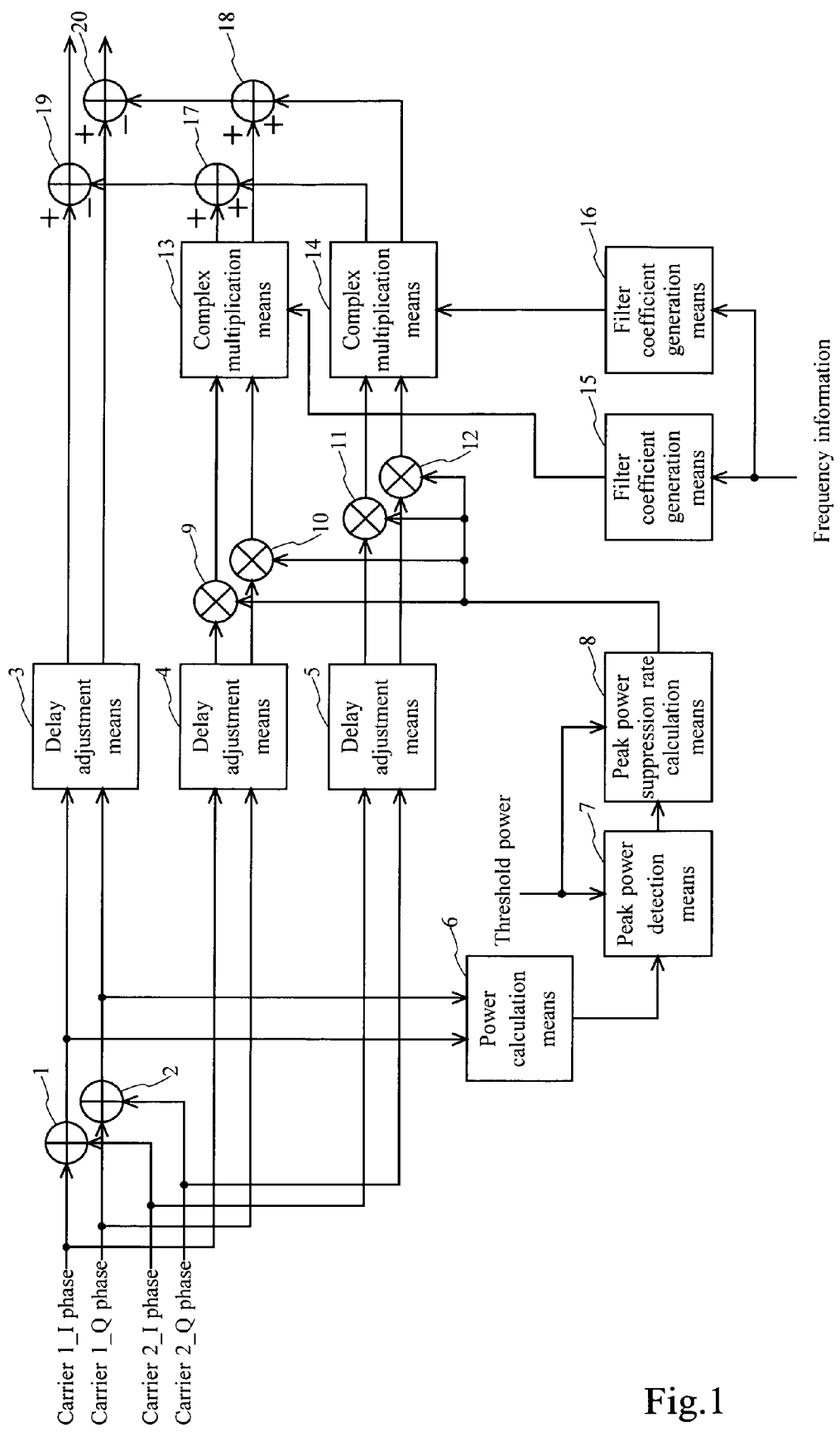
FIG. 1 is a diagram showing an exemplary configuration of a peak power suppression means provided in a transmitter according to a first embodiment of the present invention.

FIG. 1 shows an exemplary configuration of a peak power suppression means provided in a transmitter according to a first embodiment of the present invention.

The peak power suppression means of the present embodiment includes: adders 1, 2; delay adjustment means 3, 4, 5; a power calculation means 6; a peak power detection means 7; a peak power suppression rate calculation means 8; multipliers 9, 10, 11, 12; complex multiplication means 13, 14; filter coefficient generation means 15, 16; adders 17, 18; and subtracters 19, 20.

An exemplary operation performed in the peak power suppression means of the present embodiment will be described below.

In the present embodiment, there is shown a case where two carriers 1, 2 are used as a plurality of carriers.

The adder 1 adds and synthesizes I phases of respective input carrier signals, and outputs the resultant I phase component of a multi-carrier-synthesized signal to the delay adjustment means 3 and the power calculation means 6.

The adder 2 adds and synthesizes Q phases of respective input carrier signals, and outputs the resultant Q phase component of a multi-carrier-synthesized signal to the delay adjustment means 3 and the power calculation means 6.

As shown in Eq. (1), for example, the power calculation means 6 calculates an instantaneous power value for each sample from I phase and Q phase components of the multi-carrier-synthesized signal inputted from the two adders 1, 2, and outputs the calculated result to the peak power detection means 7.

The peak power detection means 7 compares the power value of the multi-carrier-synthesized signal, inputted from the power calculation means 6, with a threshold power for each sample, and determines, as a peak power, a sample having a power value greater than the threshold power. Then, if the peak power is detected, for example, the peak power detection means 7 outputs, as the comparison result, the power value of the peak power to the peak power suppression rate calculation means 8, and if no peak power is detected, the peak power detection means 7 outputs 0 data to the peak power suppression rate calculation means 8.

In this embodiment, the threshold power is, for example, set and stored in a memory in advance, and the value thereof is inputted to the peak power detection means 7 and the peak power suppression rate calculation means 8. Alternative embodiment may employ a configuration in which the threshold power is appropriately modified in accordance with communication status and the like.

Further, if the threshold power is set at a low level, the peak power might occur continuously for several samples; therefore, by determining only the maximum one of the continuous peak powers as an object to be suppressed, excessive suppression can be prevented.

It should be noted that in the present embodiment, the peak is detected using power value, but the peak is equally detected even if the square root thereof is taken and amplitude value is used.

The peak power suppression rate calculation means 8 determines the ratio between the peak power and the threshold power based on an input from the peak power detection means 7, calculates a rate (i.e., a peak power suppression rate) at which the peak power is suppressed to the threshold power level, and then outputs the calculated result to the four multipliers 9 to 12.

In the present embodiment, the peak power suppression means is configured so that the peak power is suppressed by subtracting an amplitude component exceeding the threshold value from a transmission signal, and the peak power suppression rate is calculated as shown in Eq. (2).

The delay adjustment means 4 supplies a first input carrier signal (i.e., the IQ components of the signal of the carrier 1) with delays equivalent to process delays, which occur along a path leading from the adders 1, 2 to the peak power suppression rate calculation means 8, outputs the resultant I phase signal to the multiplier 9, and outputs the resultant Q phase signal to the multiplier 10.

The delay adjustment means 5 supplies a second input carrier signal (i.e., the IQ components of the signal of the carrier 2) with delays equivalent to process delays, which occur along the path leading from the adders 1, 2 to the peak power suppression rate calculation means 8, outputs the resultant I phase signal to the multiplier 11, and outputs the resultant Q phase signal to the multiplier 12.

The multiplier 9 multiplies the I phase component of the delay-adjusted first input carrier signal, inputted from the delay adjustment means 4, by the peak power suppression rate inputted from the peak power suppression rate calculation means 8, generates the resultant I phase component of a first peak power suppression signal, and then outputs the I phase component to the complex multiplication means 13.

The multiplier 10 multiplies the Q phase component of the delay-adjusted first input carrier signal, inputted from the delay adjustment means 4, by the peak power suppression rate inputted from the peak power suppression rate calculation means 8, generates the resultant Q phase component of the first peak power suppression signal, and then outputs the Q phase component to the complex multiplication means 13.

These IQ components constitute the first peak power suppression signal.

The multiplier 11 multiplies the I phase component of the delay-adjusted second input carrier signal, inputted from the delay adjustment means 5, by the peak power suppression rate inputted from the peak power suppression rate calculation means 8, generates the resultant I phase component of a second peak power suppression signal, and then outputs the I phase component to the complex multiplication means 14.

The multiplier 12 multiplies the Q phase component of the delay-adjusted second input carrier signal, inputted from the delay adjustment means 5, by the peak power suppression rate inputted from the peak power suppression rate calculation means 8, generates the resultant Q phase component of the second peak power suppression signal, and then outputs the Q phase component to the complex multiplication means 14.

These IQ components constitute the second peak power suppression signal.

Based on frequency information of the first input carrier signal, the filter coefficient generation means 15 generates a first filter coefficient having a frequency characteristic for limiting the frequency band of the first peak power suppression signal to a desired frequency band, and then outputs the resultant first filter coefficient to the complex multiplication means 13.

Based on frequency information of the second input carrier signal, the filter coefficient generation means 16 generates a second filter coefficient having a frequency characteristic for limiting the frequency band of the second peak power suppression signal to a desired frequency band, and then outputs the resultant second filter coefficient to the complex multiplication means 14.

In this embodiment, the frequency information of each input carrier signal is, for example, set and stored in a memory in advance, and the information is inputted to each of the filter coefficient generation means 15, 16. Alternative embodiment may employ a configuration in which the frequency information of each input carrier signal is appropriately modified in accordance with communication status and the like.

The frequency band of each peak power suppression signal is preferably similar to that of each input carrier signal, or preferably falls within the frequency band of each input carrier signal in terms of the quality of spectrum waveform.

The complex multiplication means 13 complex-multiplies the first peak power suppression signal, inputted from the multipliers 9, 10, by the first filter coefficient inputted from the filter coefficient generation means 15, outputs the resultant I phase component of the first peak power suppression signal, whose band is limited to the frequency band falling within that of the first input carrier signal, to the adder 17, and outputs the resultant Q phase component of the first peak power suppression signal to the adder 18.

The complex multiplication means 14 complex-multiplies the second peak power suppression signal, inputted from the multipliers 11, 12, by the second filter coefficient inputted from the filter coefficient generation means 16, outputs the resultant I phase component of the second peak power suppression signal, whose band is limited to the frequency band falling within that of the second input carrier signal, to the adder 17, and outputs the resultant Q phase component of the second peak power suppression signal to the adder 18.

In this embodiment, if a W-CDMA method, for example, is utilized, these complex multiplications are performed using Eq. (3).

The adder 17 adds and synthesizes the I phase component of the first peak power suppression signal inputted from the complex multiplication means 13, and the I phase component of the second peak power suppression signal inputted from the complex multiplication means 14, and then outputs the result to the subtracter 19.

The adder 18 adds and synthesizes the Q phase component of the first peak power suppression signal inputted from the complex multiplication means 13, and the Q phase component of the second peak power suppression signal inputted from the complex multiplication means 14, and then outputs the result to the subtracter 20.

The delay adjustment means 3 supplies an input transmission signal, produced by multi-carrier synthesis and inputted from the adders 1, 2, with delays equivalent to process delays, which occur along a path leading from the power calculation means 6 to the adders 17, 18, outputs the resultant I phase component to the subtracter 19, and outputs the resultant Q phase component to the subtracter 20.

For the I phase component, the subtracter 19 subtracts, from the multi-carrier-synthesized transmission signal inputted from the delay adjustment means 3, the peak power suppression signal inputted from the adder 17, and outputs the resultant transmission signal whose peak power has been suppressed.

For the Q phase component, the subtracter 20 subtracts, from the multi-carrier-synthesized transmission signal inputted from the delay adjustment means 3, the peak power suppression signal inputted from the adder 18, and outputs the resultant transmission signal whose peak power has been suppressed.

These signals, outputted from the subtracters 19, 20 provided for the respective I phase and Q phase, constitute the transmission signal whose peak power has been suppressed.

This embodiment shows the exemplary configuration of the peak power suppression means intended for the case of two-carrier transmission at the maximum; however, in the case of using three or more carriers, the delay adjustment means, multiplier for multiplying an input carrier signal by a peak power suppression rate, complex multiplication means, and filter coefficient generation means may be provided in accordance with the number of carriers, for example, thus making it possible to cope with any number of carriers.

As described above, in the peak power suppression means of the present embodiment, in suppressing a peak power existing in a multi-carrier transmission signal produced by synthesizing an N number (where N is an integer of 1 or more) of carriers, the N number of carrier signals, each carrier frequency of which has been subjected to digital quadrature modulation, are provided as input signals. And the peak power suppression means includes: the multi-carrier addition means 1, 2 for performing multi-carrier addition on the N number of input carrier signals; the power calculation means 6 for calculating an instantaneous power value for each sample for output signals from the multi-carrier addition means 1, 2; the peak power detection means 7 for comparing the instantaneous power value, calculated by the power calculation means 6, with a set threshold value to detect, as a peak power, the instantaneous power value greater than the set threshold value; the peak power suppression rate calculation means 8 for calculating a peak power suppression rate for the peak power detected by the peak power detection means 7; the N number of the multiplication means 9 to 12 (including two multipliers associated with the I phase and two multipliers associated with the Q phase in this embodiment) for multiplying the peak power suppression rate, calculated by the peak power suppression rate calculation means 8, by each of the N number of input carrier signals, and for outputting peak power suppression signals for the respective carriers; the N number of the complex multiplication means 13, 14 for complex-multiplying the N number of the peak power suppression signals by filter coefficients having frequency characteristics for limiting the frequency bands of the signals to respective desired frequency bands, and for outputting the peak power suppression signals whose bands have been limited; the addition means 17, 18 (including two adders so as to be associated with the I phase and the Q phase in this embodiment) for adding and synthesizing output signals from the N number of the complex multiplication means 13, 14, and for outputting respective single peak power suppression signals; and the subtraction means 19, 20 (including two subtracters so as to be associated with the I phase and the Q phase in this embodiment) for subtracting, from multi-carrier transmission signals outputted from the multi-carrier addition means 1, 2, the peak power suppression signals outputted from the addition means 17, 18, and for outputting the transmission signals whose peak powers have been suppressed.

It should be noted that in the peak power suppression means, provided in the transmitter of the present embodiment and shown in FIG. 1, the following means are provided. A coefficient multiplication means is provided by the functions of the complex multiplication means 13, 14 for complex-multiplying filter coefficients for respective carrier signals, generated by the filter coefficient generation means 15, 16, by the respective carrier signals. A summing means is provided by the functions of the adders 17, 18 for adding the multiplied results for all the carrier signals. A suppression rate generation means is provided by the functions of the power calculation means 6, peak power detection means 7 and peak power suppression rate calculation means 8 for generating a peak power suppression rate (i.e., an example of a peak level suppression rate) A suppression rate multiplication means is provided by the functions of the multipliers 9 to 12 for multiplying the respective carrier signals by the peak power suppression rate. A suppression signal generation means is provided by the functions of these for generating a peak power suppression signal (i.e., an example of a peak level suppression signal). And a suppression signal subtraction means is provided by the functions of the subtracters 19, 20 for subtracting the peak power suppression signals from multi-carrier signals.

Embodiment 2

A second embodiment of the present invention will be described below.

Figure 2:
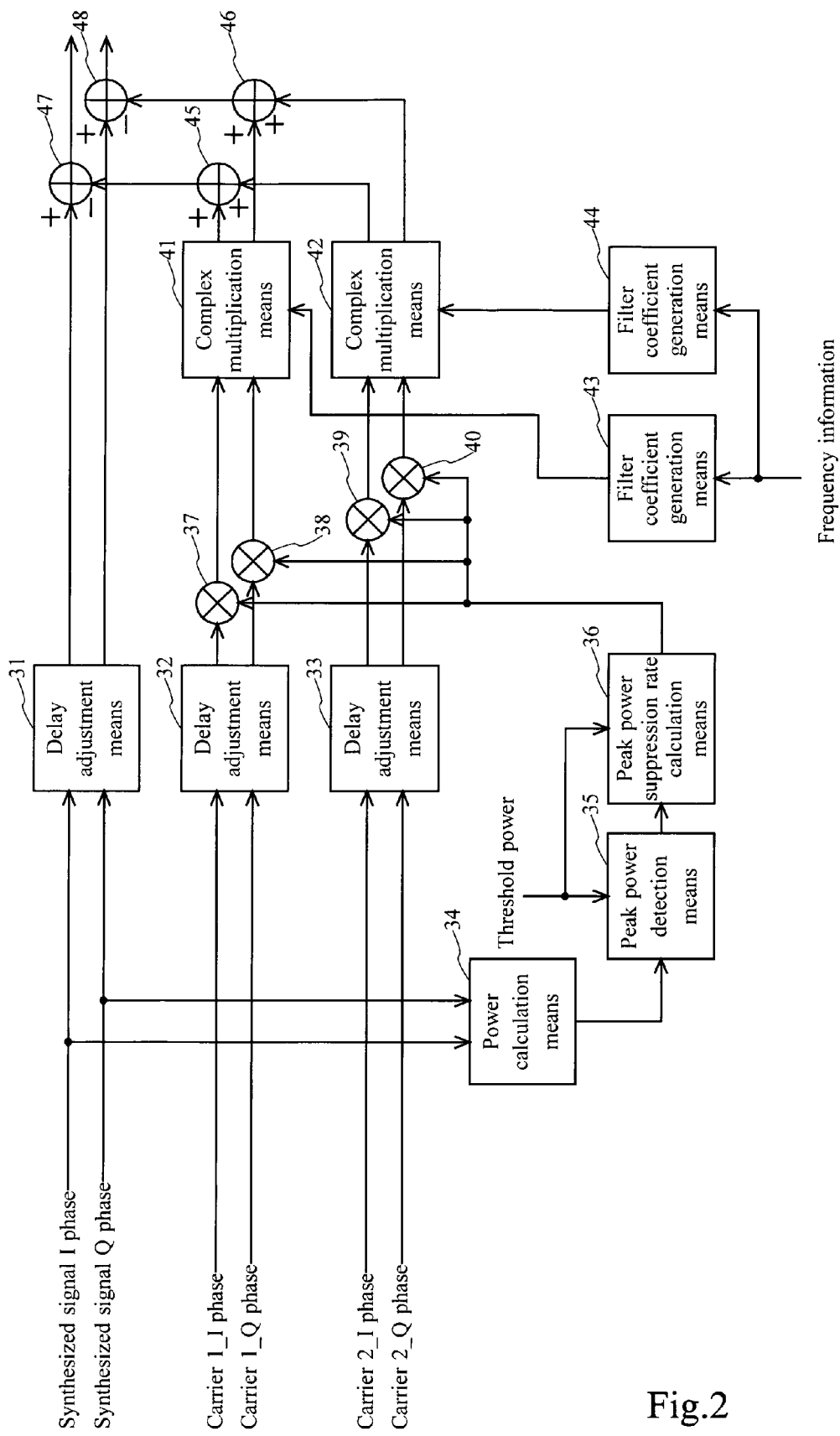
FIG. 2 is a diagram showing an exemplary configuration of a peak power suppression means provided in a transmitter according to a second embodiment of the present invention.

FIG. 2 shows an exemplary configuration of a peak power suppression means provided in a transmitter according to the second embodiment of the present invention.

The peak power suppression means of the present embodiment includes: delay adjustment means 31, 32, 33; a power calculation means 34; a peak power detection means 35; a peak power suppression rate calculation means 36; multipliers 37, 38, 39, 40; complex multiplication means 41, 42; filter coefficient generation means 43, 44; adders 45, 46; and subtracters 47, 48.

In this embodiment, the configuration and operation of the peak power suppression means shown in FIG. 2 are similar to those of the peak power suppression means shown in FIG. 1 except that carrier signals (carriers 1 and 2) and a signal (synthesized signal) produced by multi-carrier synthesis of the carrier signals are provided as input signals. And respective processing parts 31 to 48 shown in FIG. 2 are also operated similarly to the respective processing parts 3 to 20 shown in FIG. 1.

It should be noted that the peak power suppression means of the present embodiment is also intended for the case of two-carrier transmission at the maximum as in the case of FIG. 1, for example; however, in the case of using three or more carriers, the delay adjustment means, multiplier for multiplying an input carrier signal by a peak power suppression rate, complex multiplication means, and filter coefficient generation means may be provided in accordance with the number of carriers, thus making it possible to cope with any number of carriers.

As described above, in the peak power suppression means of the present embodiment, an N number (where N is an integer of 1 or more) of carrier signals, each carrier frequency of which has been subjected to digital quadrature modulation, and a signal produced by multi-carrier synthesis of the N number of the carrier signals are provided as input signals. And the power calculation means 34 calculates an instantaneous power value for each sample for the input multi-carrier-synthesized signal, and the subtracters 47, 48 subtract, from the input multi-carrier signals, peak power suppression signals outputted from the addition means 45, 46 to output transmission signals whose peak powers have been suppressed.

Embodiment 3

A third embodiment of the present invention will be described below.

Figure 3:
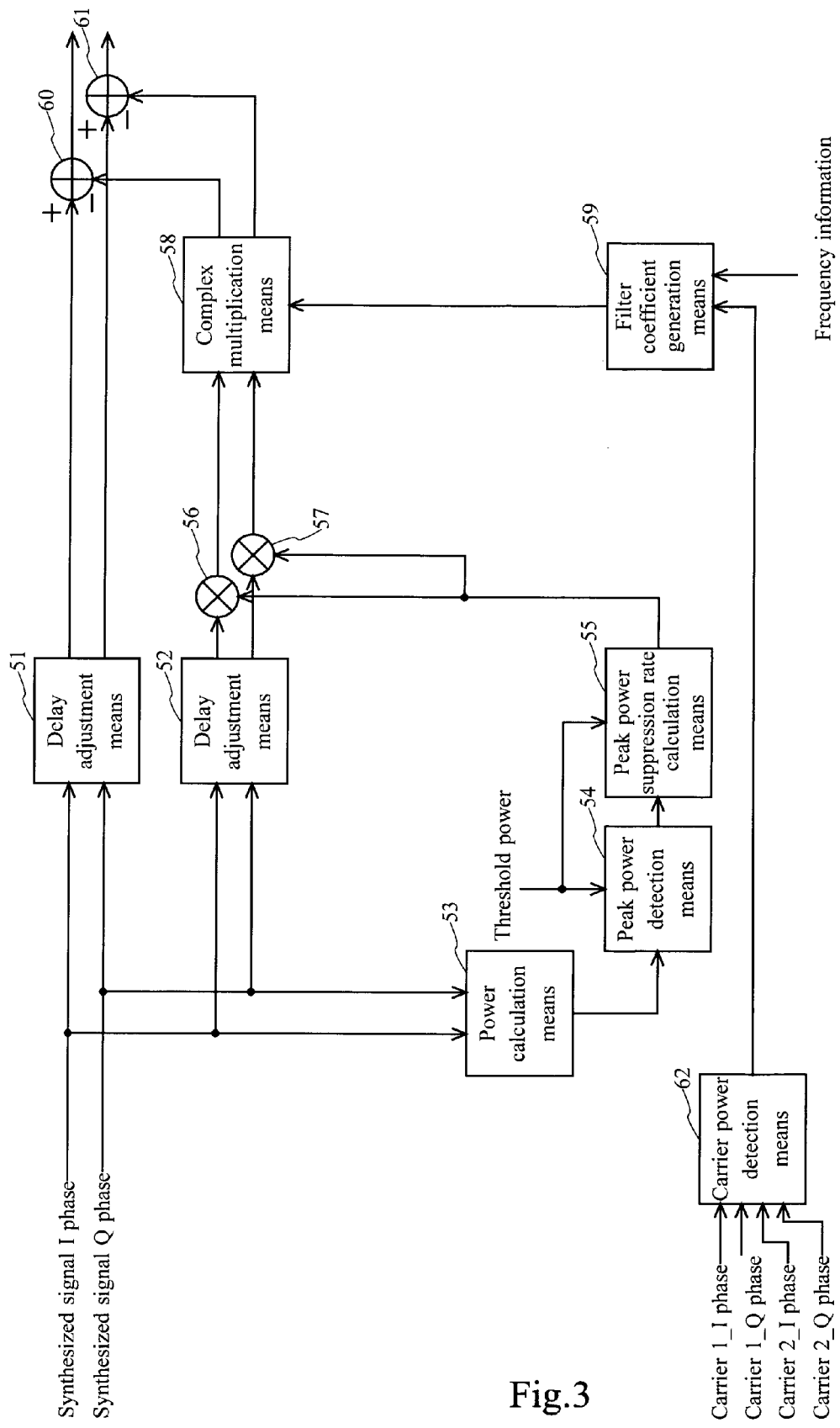
FIG. 3 is a diagram showing an exemplary configuration of a peak power suppression means provided in a transmitter according to a third embodiment of the present invention.

FIG. 3 shows an exemplary configuration of a peak power suppression means provided in a transmitter according to the third embodiment of the present invention.

The peak power suppression means of the present embodiment includes: delay adjustment means 51, 52; a power calculation means 53; a peak power detection means 54; a peak power suppression rate calculation means 55; multipliers 56, 57; a complex multiplication means 58; a filter coefficient generation means 59; subtracters 60, 61; and a carrier power detection means 62.

Figure 16:
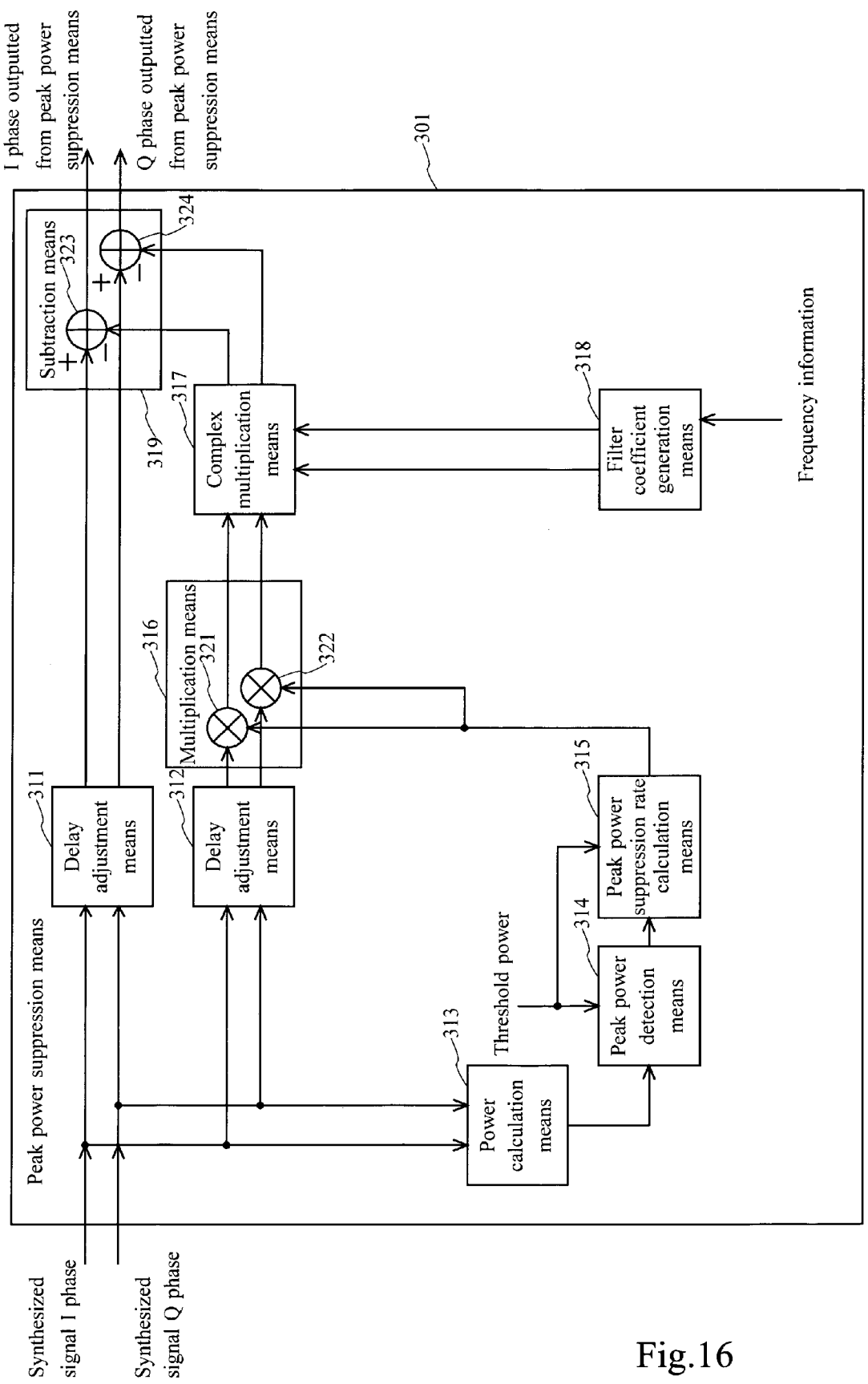
FIG. 16 is a diagram showing an exemplary configuration of a peak power suppression means according to a conventional technology.
Figure 17:
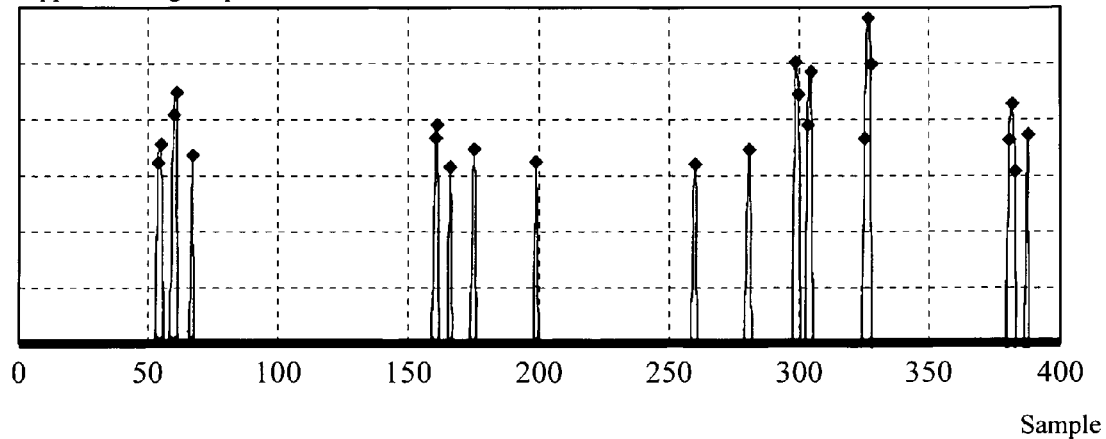
FIG. 17 is a graph showing an exemplary time waveform of an output signal from a peak power detection means.
Figure 18:
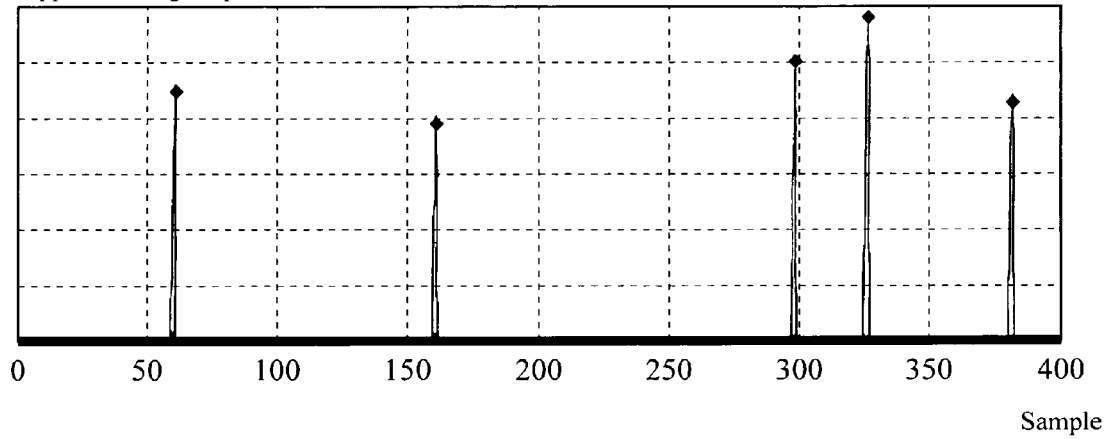
FIG. 18 is a graph showing an exemplary time waveform of an output signal from the peak power detection means for extracting a maximum peak.
Figure 19:
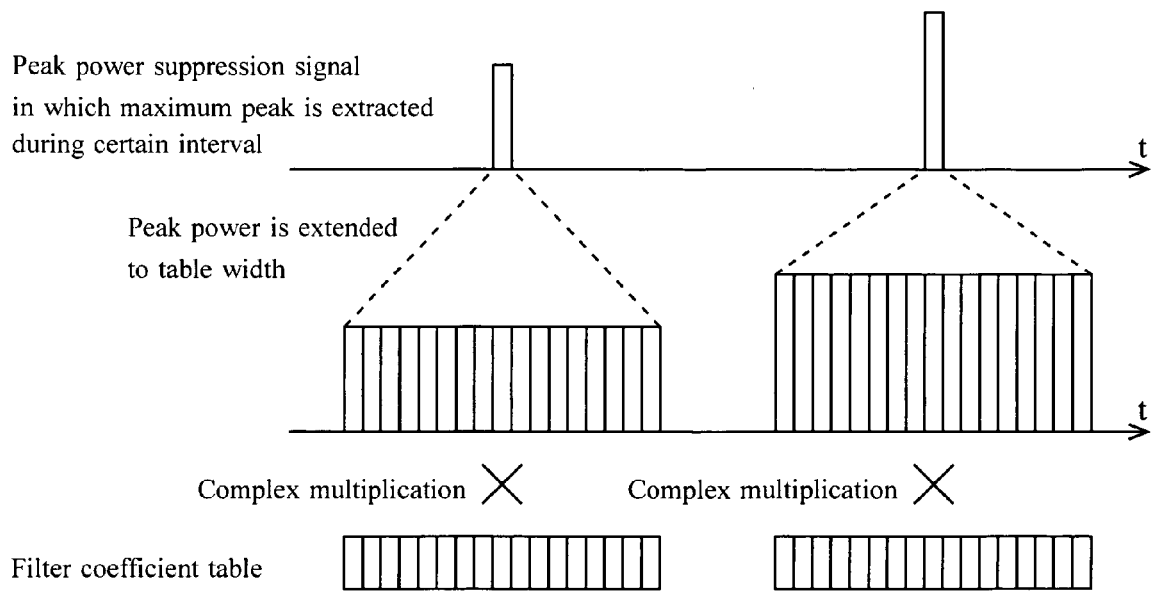
FIG. 19 is a diagram showing an exemplary image of complex multiplication of a peak power suppression signal and a filter coefficient.

In this embodiment, the delay adjustment means 51, 52, the power calculation means 53, the peak power detection means 54, the peak power suppression rate calculation means 55, the multipliers 56, 57, the complex multiplication means 58, and the subtracters 60, 61 are operated similarly to the respective processing parts 311 to 317, and 319 of the peak power suppression means shown in FIG. 16, for example, and therefore, the detailed description thereof will be omitted in the present embodiment.

The carrier power detection means 62 determines an average power value of respective carrier signals prior to multi-carrier synthesis, and outputs the resultant average power value to the filter coefficient generation means 59. Before the multi-carrier synthesis is performed, the average power value remains unchanged both prior to and subsequent to digital quadrature modulation of carrier frequency. As a time interval during which the average power is determined, a long time width is not suitable in order to cope with a burst signal, for example, and a time width approximately corresponding to the tap length of a filter coefficient (2 to 5 chip) is appropriate.

The filter coefficient generation means 59 receives transmission carrier frequency information (i.e., frequency information) and the average power value of the respective carrier signals determined by the carrier power detection means 62, multiplies a filter coefficient associated with the respective carriers by a weight coefficient according to the magnitude of the average power to generate a synthesized filter coefficient, and then outputs the resultant filter coefficient to the complex multiplication means 58.

A specific example will be described below.

Based on an average power difference of the respective inputted carriers, the filter coefficient generation means 59 multiplies, for the carrier with a smaller average power, a weight coefficient smaller than 1 by a filter coefficient associated with the carrier with a smaller average power. For example, when a level difference between two carriers is 5 dB, the filter coefficient of the low level carrier is multiplied by a weight coefficient that takes on a value equivalent to −5 dB, thus dropping the gain of the filter by 5 dB.

Figure 4:
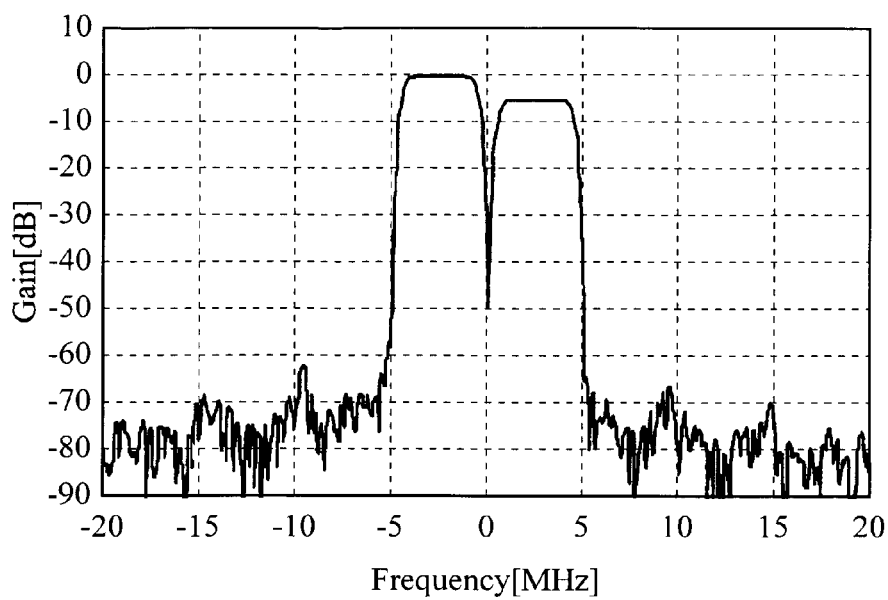
FIG. 4 is a graph showing an example of a frequency characteristic of a filter coefficient generated in the peak power suppression means in the case where a level difference is 5 dB.

FIG. 4 shows an example of frequency characteristic of the filter in this case. The horizontal axis represents frequency [MHz], while the vertical axis represents gain [dB].

As described above, in suppressing a peak power existing in a multi-carrier transmission signal produced by synthesizing an N number (where N is an integer of 1 or more) of carriers, the peak power suppression means of the present embodiment includes: the power calculation means 53 for calculating an instantaneous power value for each sample for an input multi-carrier-synthesized signal; the peak power detection means 54 for comparing the instantaneous power value, calculated by the power calculation means 53, with a set threshold value to detect, as a peak power, the instantaneous power value greater than the set threshold value; the peak power suppression rate calculation means 55 for calculating a peak power suppression rate for the peak power detected by the peak power detection means 54; the multiplication means 56, 57 for multiplying the peak power suppression rate, calculated by the peak power suppression rate calculation means 55, by the input multi-carrier-synthesized signal to output a peak power suppression signal; the complex multiplication means 58 for complex-multiplying the peak power suppression signal by a filter coefficient, which has a frequency characteristic for limiting the frequency band of the signal to a desired frequency band and is gain-adjusted for each pass band of the carriers in accordance with the powers thereof, and for outputting the peak power suppression signal whose band has been limited; and the subtracters 60, 61 for subtracting, from the input multi-carrier-synthesized signal, the output signal from the complex multiplication means 58 to output the transmission signal whose peak power has been suppressed.

It should be noted that in the peak power suppression means, provided in the transmitter of the present embodiment and shown in FIG. 3, the following means are provided. A coefficient generation means is provided by the functions of the carrier power detection means 62 and filter coefficient generation means 59 for generating filter coefficients in accordance with the levels of the respective carrier signals. A coefficient summing means is provided by the function of the filter coefficient generation means 59 for summing the filter coefficients for all the carrier signals. A signal multiplication means is provided by the function of the complex multiplication means 58 for multiplying the summed result by the multi-carrier signal. A suppression rate generation means is provided by the functions of the power calculation means 53, peak power detection means 54 and peak power suppression rate calculation means 55 for generating a peak power suppression rate (i.e., an example of a peak level suppression rate). A suppression rate multiplication means is provided by the functions of the multipliers 56, 57 for multiplying the multi-carrier signal by the peak power suppression rate. A suppression signal generation means is provided by the functions of these for generating a peak power suppression signal (i.e., an example of a peak level suppression signal). And a suppression signal subtraction means is provided by the functions of the subtracters 60, 61 for subtracting the peak power suppression signal from the multi-carrier signal.

Embodiment 4

A fourth embodiment of the present invention will be described below.

Figure 9:
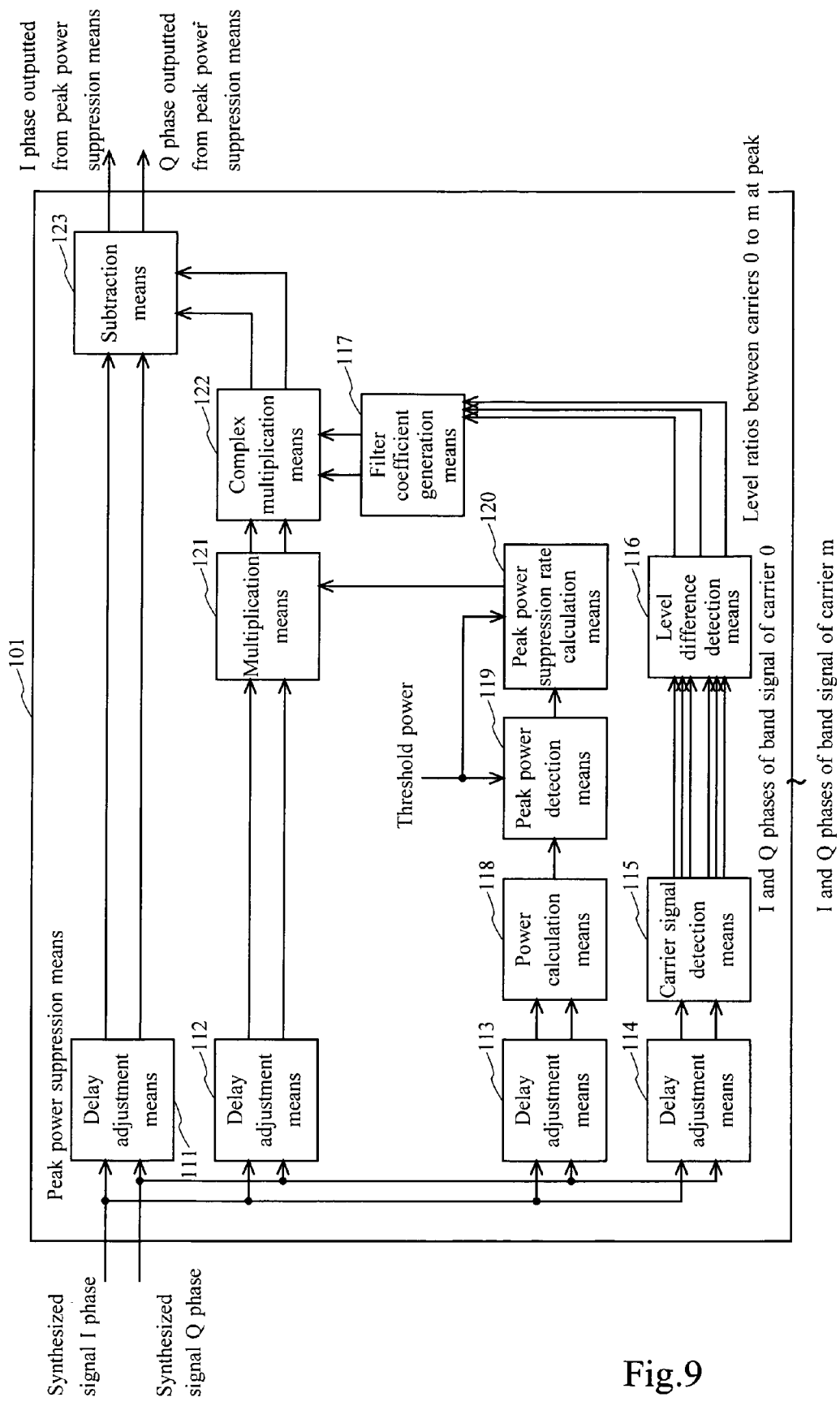
FIG. 9 is a diagram showing an exemplary configuration of a peak power suppression means according to a fourth embodiment of the present invention.

FIG. 9 shows an exemplary configuration of a peak power suppression means 101 provided in a transmitter according to the fourth embodiment of the present invention.

The peak power suppression means 101 of the present embodiment includes: four delay adjustment means 111, 112, 113, 114; a carrier signal detection means 115; a level difference detection means 116; a filter coefficient generation means 117; a power calculation means 118; a peak power detection means 119; a peak power suppression rate calculation means 120; a multiplication means 121; a complex multiplication means 122; and a subtraction means 123.

An exemplary operation performed in the peak power suppression means 101 of the present embodiment will be described below.

In the present embodiment, I phase component and Q phase component of a synthesized signal of a plurality of carriers (carrier 0 to carrier m) are inputted to the peak power suppression means 101.

The respective delay adjustment means 111 to 114 perform delay adjustment on input signals so as to synchronize the timing of operations at output terminals of the respective processing systems. The delay adjustment means 111 outputs the delayed input signal to the subtraction means 123, the delay adjustment means 112 outputs the delayed input signal to the multiplication means 121, the delay adjustment means 113 outputs the delayed input signal to the power calculation means 118, and the delay adjustment means 114 outputs the delayed input signal to the carrier signal detection means 115.

Based on the I phase component and Q phase component of the signal inputted from the delay adjustment means 113, the power calculation means 118 calculates an instantaneous power for each sample, and outputs the calculated result to the peak power detection means 119.

The peak power detection means 119 compares the power value of the input signal, inputted from the power calculation means 118, with a predetermined threshold power for each sample to determine, as a peak power, a sample having a power value greater than the threshold power, and then outputs the comparison result to the peak power suppression rate calculation means 120. If the peak power is detected, the peak power detection means 119 outputs, as the comparison result, the power value of the peak power, and if no peak power is detected, the peak power detection means 119 outputs 0 data.

The peak power suppression rate calculation means 120 determines the ratio between the peak power inputted from the peak power detection means 119 and the predetermined threshold power, calculates a rate (i.e., a peak power suppression rate) at which the peak power is suppressed to the level of the threshold power, and then outputs the calculated result to the multiplication means 121.

The multiplication means 121 has a multiplier associated with the I phase component and a multiplier associated with the Q phase component, for example, multiplies the IQ components of the delay-adjusted input signal, inputted from the delay adjustment means 112, at the time of peak detection by the peak power suppression rate inputted from the peak power suppression rate calculation means 120, generates a peak power suppression signal, which is a suppression amplitude component of the peak power, and then outputs the generated peak power suppression signal to the complex multiplication means 122.

The carrier signal detection means 115 extracts band signals of the respective carriers from the I phase and Q phase components of the signals inputted from the delay adjustment means 114, and outputs the extracted results to the level difference detection means 116.

Figure 10:
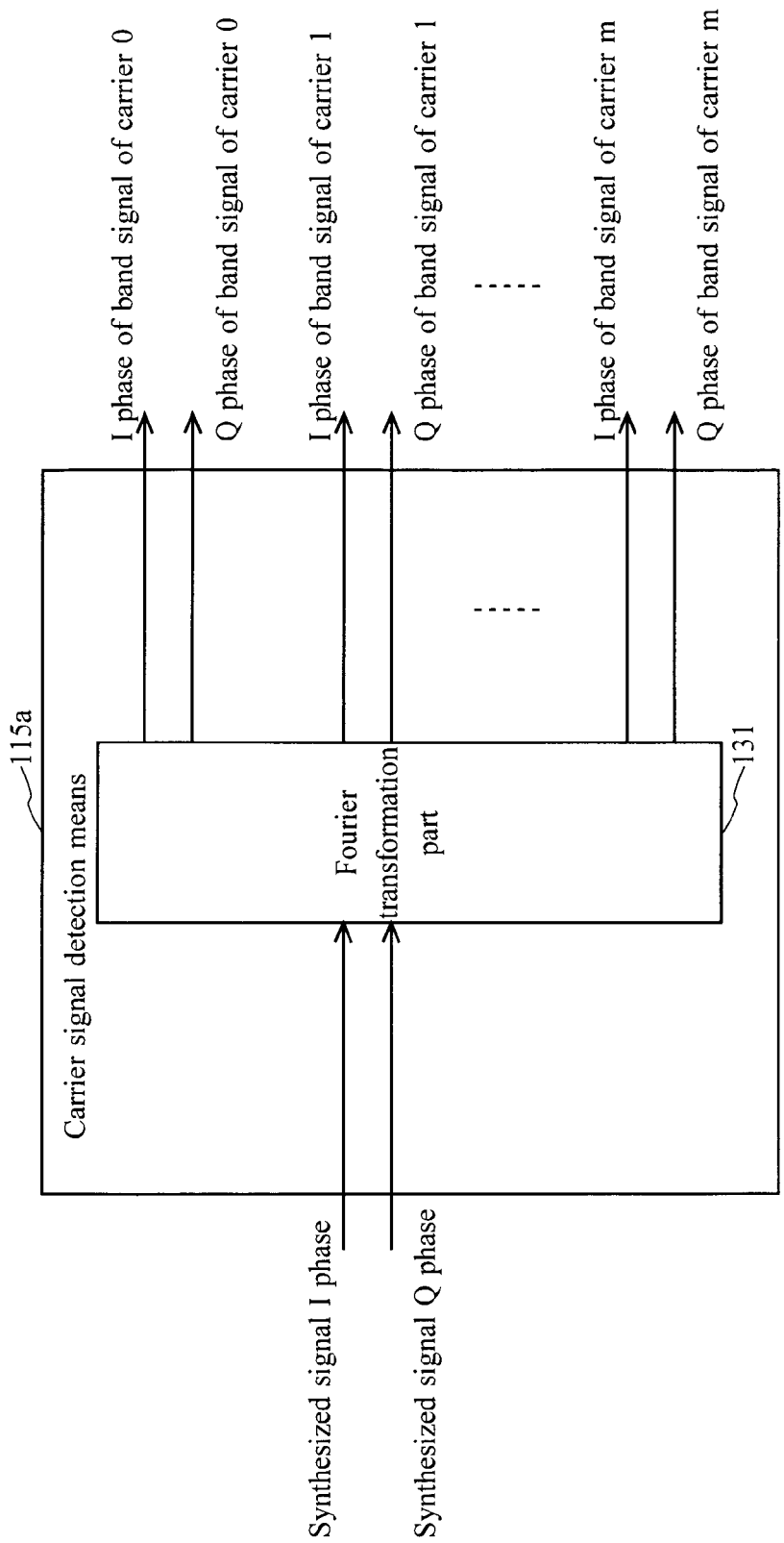
FIG. 10 is a diagram showing an exemplary configuration of a carrier signal detection means.

FIG. 10 shows, as an example of the configuration of the carrier signal detection means 115, an exemplary configuration of a carrier signal detection means 115*a*.

The carrier signal detection means 115*a* of this example includes a Fourier transformation part 131.

The Fourier transformation part 131 has a function of performing Fourier transformation by FFT (Fast Fourier Transform), for example, and extracts signals (i.e., IQ components) of frequency components of the respective carrier signals from the input signals (i.e., IQ components of multi-carrier-synthesized signals), sent from the delay adjustment means 114, to output the extracted results to the level difference detection means 116.

Figure 11:
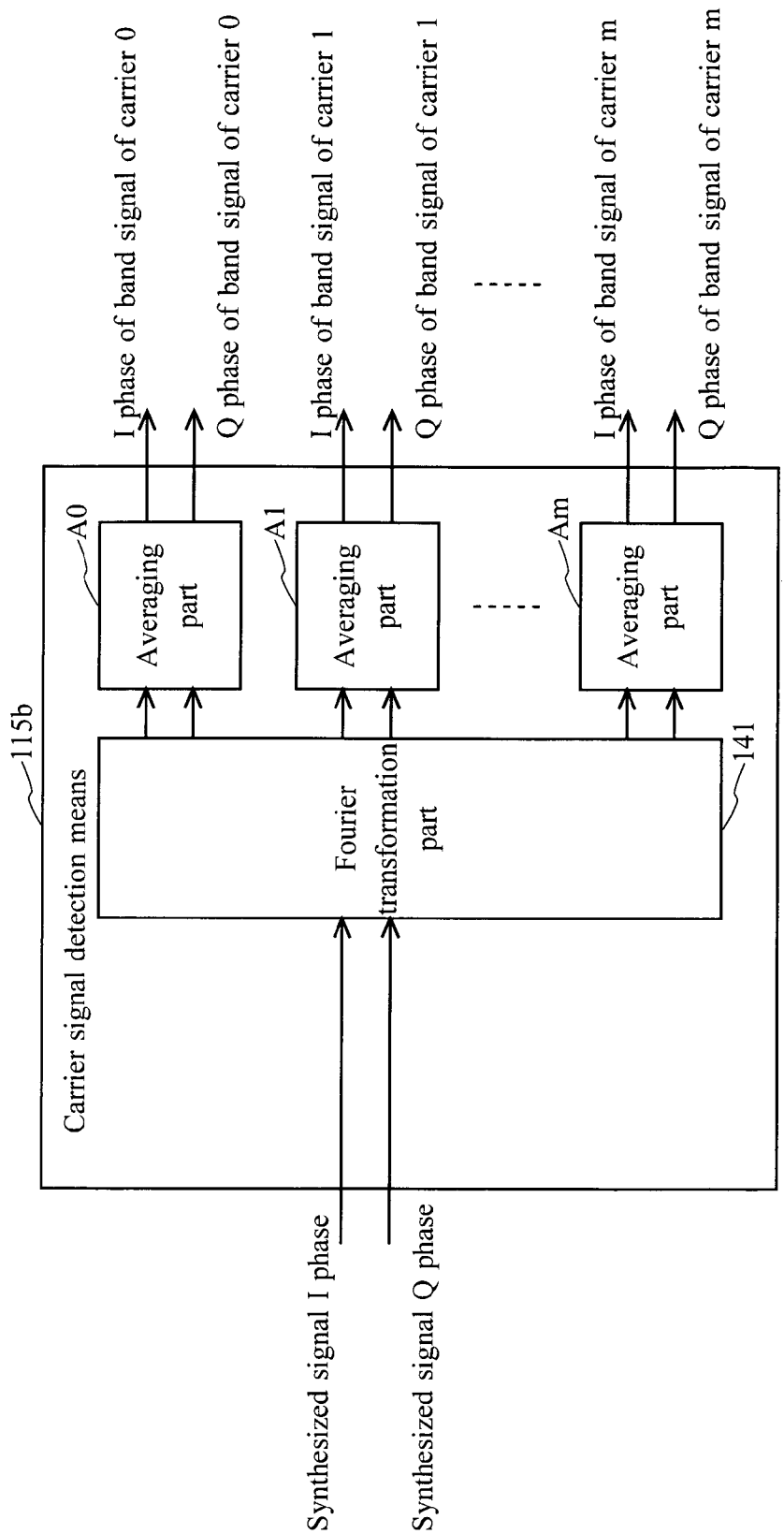
FIG. 11 is a diagram showing another exemplary configuration of a carrier signal detection means.

FIG. 11 shows, as another example of the configuration of the carrier signal detection means 115, an exemplary configuration of a carrier signal detection means 115*b*.

The carrier signal detection means 115*b* of this example includes a Fourier transformation part 141, and a plurality of averaging parts A0 to Am.

The Fourier transformation part 141 has a function of performing Fourier transformation by FFT, for example, and extracts signals (i.e., IQ components) of frequency components of the respective carrier signals from the input signals (i.e., IQ components of multi-carrier-synthesized signals), sent from the delay adjustment means 114, to output the extracted results to the respective averaging parts A0 to Am.

The averaging parts A0 to Am are associated with carriers 0 to m, respectively, and average the respective carrier signals inputted from the Fourier transformation part 141 to output the averaged results (i.e., IQ components) to the level difference detection means 116.

In this example, owing to the effects achieved by the averaging, for example, the level of a filter coefficient is corrected in accordance with the magnitude relationship of the carrier levels, and signal data of the respective carriers after Fourier transformation is averaged during a predetermined interval (e.g., an interval corresponding to a filter coefficient length), thus making it possible to carry out the correction with consideration given to the carrier level around the time of the peak.

Figure 12:
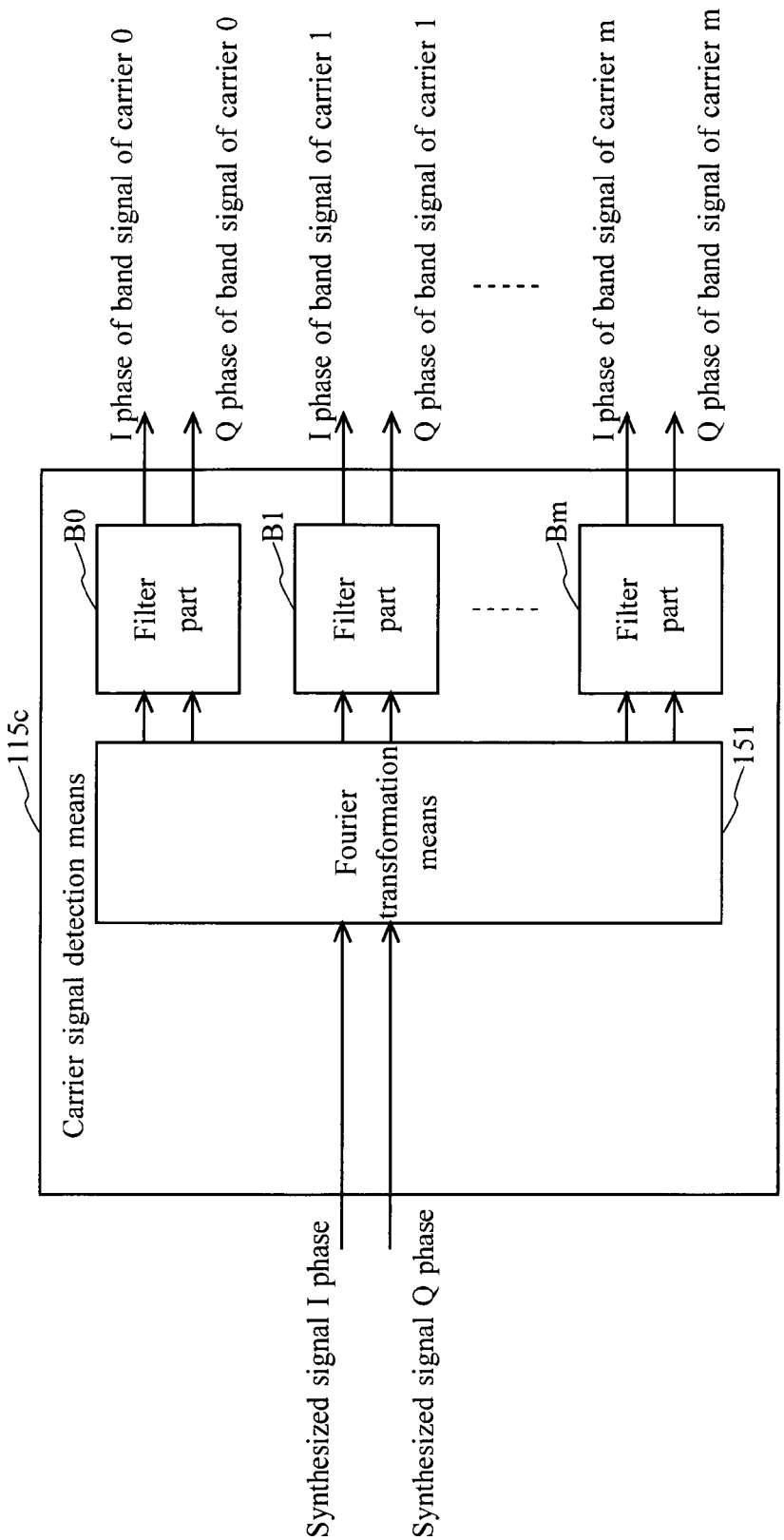
FIG. 12 is a diagram showing still another exemplary configuration of a carrier signal detection means.

FIG. 12 shows, as still another example of the configuration of the carrier signal detection means 115, an exemplary configuration of a carrier signal detection means 115*c*.

The carrier signal detection means 115*c* of this example includes a Fourier transformation part 151, and a plurality of filter parts B0 to Bm.

The Fourier transformation part 151 has a function of performing Fourier transformation by FFT, for example, and extracts signals (i.e., IQ components) of frequency components of the respective carrier signals from the input signals (i.e., IQ components of multi-carrier-synthesized signals), sent from the delay adjustment means 114, to output the extracted results to the respective filter parts B0 to Bm.

The filter parts B0 to Bm are associated with the carriers 0 to m, respectively, and perform band limitation on the respective carrier signals inputted from the Fourier transformation part 151 to output the results (i.e., IQ components) to the level difference detection means 116.

Owing to the effects achieved by the band limitation, the accuracy of detecting the carrier signals can be improved by performing the band limitation on the respective carrier signals after the Fourier transformation.

From the band signals of the respective carriers inputted from the carrier signal detection means 115, the level difference detection means 116 calculates a level difference between the respective carriers (e.g., level ratio or level correction value), and outputs the calculated results to the filter coefficient generation means 117.

Figure 13:
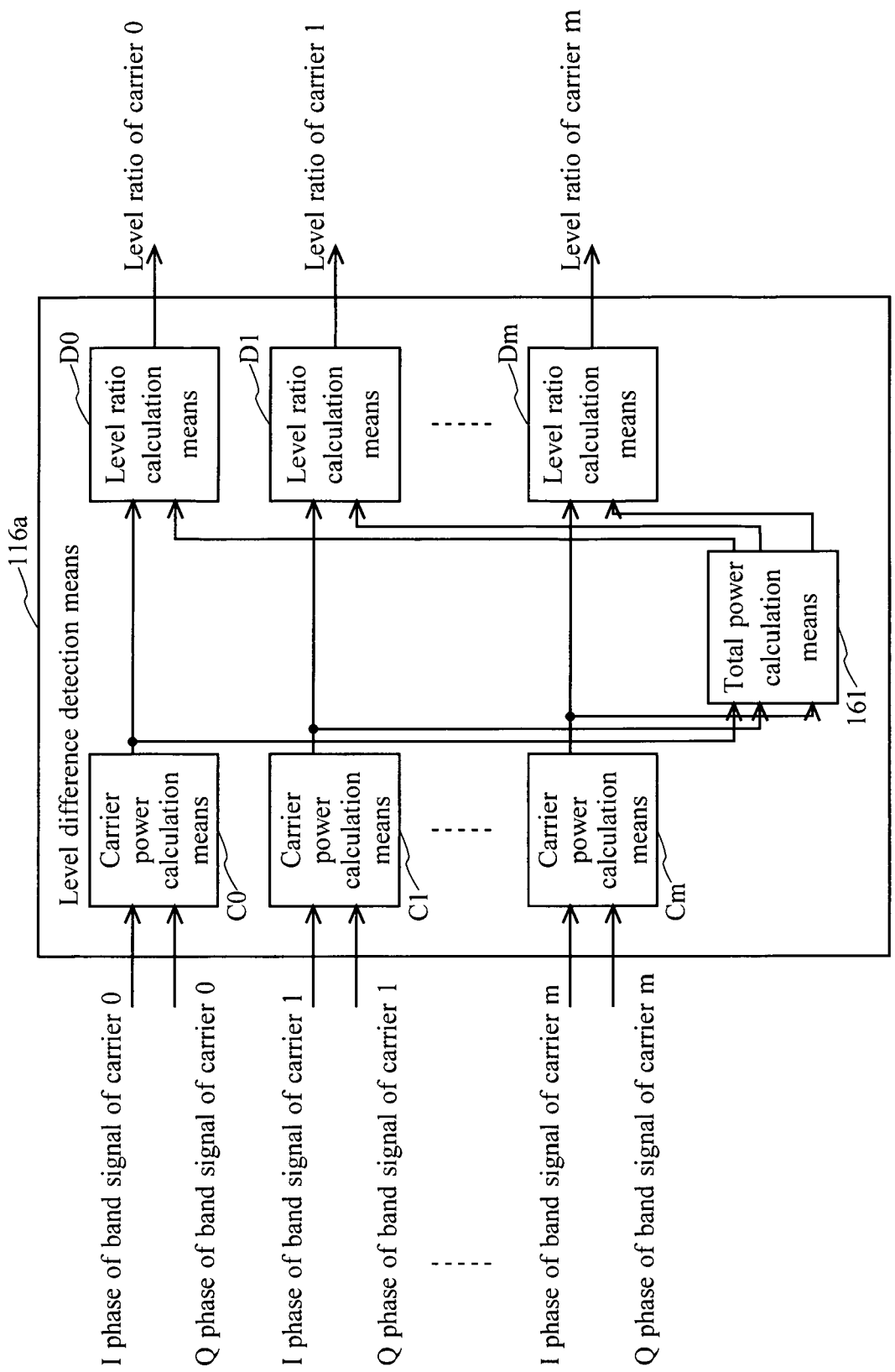
FIG. 13 is a diagram showing an exemplary configuration of a level difference detection means.

FIG. 13 shows, as an example of the configuration of the level difference detection means 116, an exemplary configuration of a level difference detection means 116*a*.

The level difference detection means 116*a* of this example includes: a plurality of carrier power calculation means C0 to Cm; a plurality of level ratio calculation means D0 to Dm; and a total power calculation means 161.

The carrier power calculation means C0 to Cm are associated with the carriers 0 to m, respectively, receive band signals (i.e., IQ components) of the respective carriers outputted from the carrier signal detection means 115 to calculate powers of the respective carrier signals, and then output the calculated results to the respective level ratio calculation means D0 to Dm, and to the total power calculation means 161.

The total power calculation means 161 calculates the total sum of the power values inputted from a plurality of the carrier power calculation means C0 to Cm, and outputs the calculated result (i.e., the total power) to the respective level ratio calculation means D0 to Dm.

The level ratio calculation means D0 to Dm are associated with the carriers 0 to m, respectively, calculate level ratios for the respective carriers based on the power values inputted from the respective carrier power calculation means C0 to Cm and the total power value inputted from the total power calculation means 161, and then output the calculated results to the filter coefficient generation means 117. As the level ratio, (Power Value for Each Carrier/Total Power Value) can be used, for example.

Figure 14:
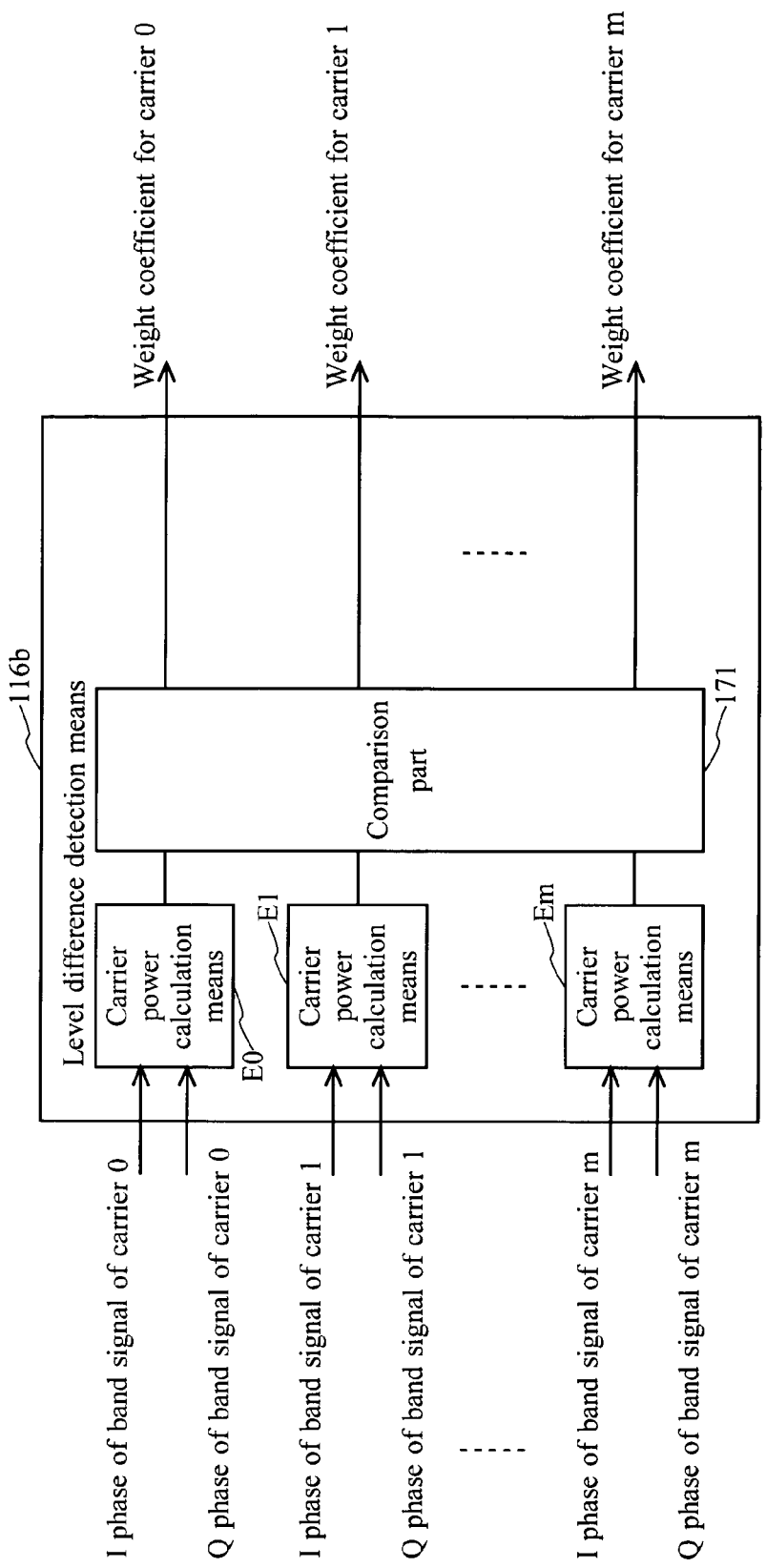
FIG. 14 is a diagram showing another exemplary configuration of a level difference detection means.

FIG. 14 shows, as another example of the configuration of the level difference detection means 116, an exemplary configuration of a level difference detection means 116*b*.

The level difference detection means 116*b* of this example includes a plurality of carrier power calculation means E0 to Em, and a comparison part 171.

The carrier power calculation means E0 to Em are associated with the carriers 0 to m, respectively, receive band signals (i.e., IQ components) of the respective carriers outputted from the carrier signal detection means 115 to calculate powers of the respective carrier signals, and then output the calculated results to the comparison part 171.

Based on the power values of the respective carriers inputted from a plurality of the carrier power calculation means E0 to Em, the comparison part 171 compares the magnitudes of the power values to rank the respective carriers, and outputs weight coefficients associated with the ranks of the respective carriers to the filter coefficient generation means 117.

It should be noted that the configuration of this example is inferior in accuracy to that shown in FIG. 13, but can reduce circuit size in terms of hardware.

Based on carrier frequency information of a transmission signal and inputs from the level difference detection means 116, the filter coefficient generation means 117 generates a filter coefficient having a frequency characteristic for limiting the frequency band of a peak power suppression signal to a desired frequency band, and outputs the resultant filter coefficient to the complex multiplication means 122.

In this example, the frequency band of the peak power suppression signal is preferably similar to that of the transmission signal, for example, or preferably falls within the frequency band of the transmission signal in terms of the quality of spectrum waveform.

It should be noted that the filter coefficient generated in this example is normally in the form of a complex coefficient in order to cope with any carrier frequency.

Furthermore, the filter coefficient generation means 117 of this example assigns a weight to a filter coefficient based on the level ratio information (or weight coefficient information) between the respective carriers calculated by the level difference detection means 116. For example, for the carrier with a higher level, the filter coefficient will be greater, and a peak power suppression signal to be generated will be greater.

Figure 15:
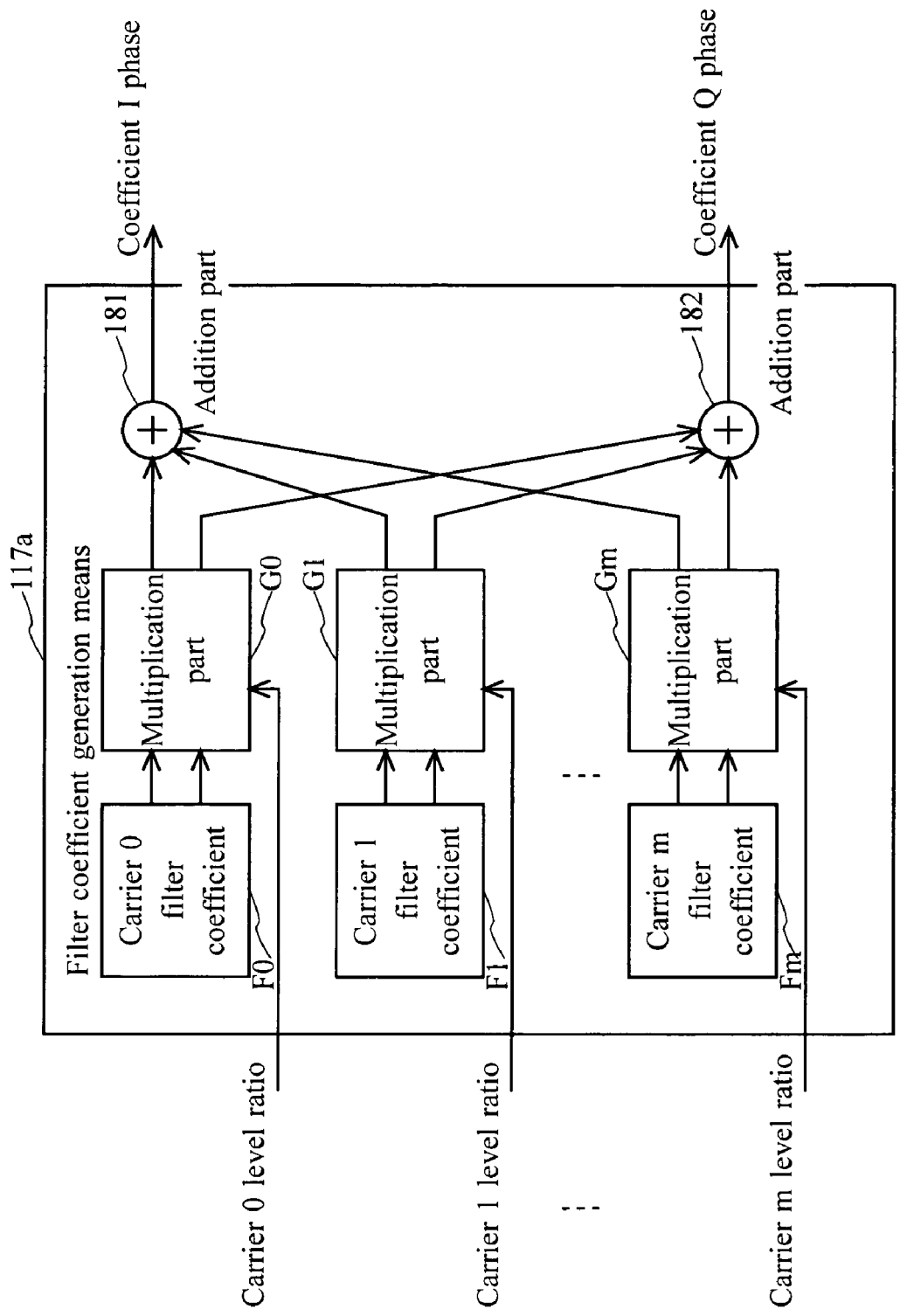
FIG. 15 is a diagram showing an exemplary configuration of a filter coefficient generation means.

FIG. 15 shows, as an example of the configuration of the filter coefficient generation means 117, an exemplary configuration of a filter coefficient generation means 117a.

The filter coefficient generation means 117a of this example includes: a plurality of filter coefficient storage parts F0 to Fm; a plurality of multiplication parts G0 to Gm; and two addition parts 181, 182.

The filter coefficient storage parts F0 to Fm are associated with the carriers 0 to m, respectively, and include memories, for example, on which filter coefficients (IQ components) having frequency characteristics associated with respective transmission carriers are stored, and from which the filter coefficients are outputted to the respective multiplication parts G0 to Gm.

The multiplication parts G0 to Gm each multiply the filter coefficient of each carrier, inputted from each of the filter coefficient storage parts F0 to Fm, by a correction value (e.g., a weight coefficient), which is based on the level ratio between the respective carriers inputted from the level difference detection means 116, and output the resultant I phase component to the addition part 181 and output the resultant Q phase component to the addition part 182.

The addition part 181 adds the I phase components inputted from a plurality of the multiplication parts G0 to Gm, and outputs, as the I phase component of the filter coefficient, the added result to the complex multiplication means 122.

The addition part 182 adds the Q phase components inputted from a plurality of the multiplication parts G0 to Gm, and outputs, as the Q phase component of the filter coefficient, the added result to the complex multiplication means 122.

The complex multiplication means 122 complex-multiplies the peak power suppression signal (IQ components), inputted from the multiplication means 121, by the filter coefficient (IQ components) inputted from the filter coefficient generation means 117, and then outputs the peak power suppression signal (IQ components), whose band has been limited to a desired frequency band, to the subtraction means 123.

The subtraction means 123 has, for example, a subtracter associated with the I phase component and a subtracter associated with the Q phase component, subtracts, from the signal (IQ components) inputted from the delay adjustment means 111, the band-limited peak power suppression signal (IQ components) inputted from the complex multiplication means 122, and then outputs the resultant signal (IQ components) whose peak power has been reduced.

As described above, in suppressing a peak power existing in a multi-carrier signal (transmission signal) produced by synthesizing a plurality of carrier signals, the peak power suppression means 101 of the present embodiment includes: the power calculation means 118 for calculating an instantaneous power value for a signal (multi-carrier signal) to which multi-carrier addition has been performed; the peak power detection means 119 for comparing the instantaneous power value, calculated by the power calculation means 118, with a set threshold value to detect, as a peak power, the instantaneous power value greater than the set threshold value; the peak power suppression rate calculation means 120 for calculating a peak power suppression rate for the peak power detected by the peak power detection means 119; the carrier signal detection means 115 for extracting, from the multi-carrier signals, signals having respective carrier frequencies; the level difference detection means 116 for calculating, based on outputs from the carrier signal detection means 115, a level difference between the carriers; the filter coefficient generation means 117 for generating a band-limiting filter coefficient in accordance with outputs from the level difference detection means 116 and carrier frequency, and for correcting the filter coefficient; the multiplication means 121 for multiplying the multi-carrier signal by the peak power suppression rate outputted from the peak power suppression rate calculation means 120; the complex multiplication means 122 for complex-multiplying an output (peak power suppression signal) from the multiplication means 121 by an output (filter coefficient) from the filter coefficient generation means 117; and the subtraction means 123 for subtracting, from the multi-carrier signal (transmission signal), the peak power suppression signal outputted from the complex multiplication means 122, and for outputting the transmission signal whose peak power has been suppressed.

Therefore, in the case of using the peak power suppression means 101 of the present embodiment, respective carrier signals are extracted, and weights are assigned to filter coefficients in accordance with power values, thus making it possible to prevent the occurrence of an unfavorable phenomenon of spectrum degradation at the time of level unbalance between carriers, which has occurred in the peak power suppression means according to the conventional technology, for example. It should be noted that, for example, the increase of hardware size by the addition of the carrier detection function can be contemplated, but if consideration is given in the framework of a module as the peak power suppression means, conversion to other system is easily enabled.

As shown in one example of FIG. 10, the carrier signal detection means 115a has the Fourier transformation part 131 for realizing the extraction of frequency component for each carrier from the multi-carrier signal by Fourier transformation.

As shown in another example of FIG. 11, the carrier signal detection means 115b includes: the Fourier transformation part 141 for realizing the extraction of frequency component for each carrier from the multi-carrier signal by Fourier transformation; and the averaging parts A0 to Am for averaging output signals from the Fourier transformation part 141.

As shown in still another example of FIG. 12, the carrier signal detection means 115c includes: the Fourier transformation part 151 for realizing the extraction of frequency component for each carrier from the multi-carrier signal by Fourier transformation; and the filter parts B0 to Bm for band-limiting output signals from the Fourier transformation part 151.

As shown in one example of FIG. 13, the level difference detection means 116a includes: the carrier power calculation means C0 to Cm for calculating, for a plurality of carriers, power values for the respective carriers from output signals sent from the carrier signal detection means 115; the total power calculation means 161 for calculating the total sum of powers outputted from the carrier power calculation means C0 to Cm; and the level ratio calculation means D0 to Dm for calculating level ratios between carriers, based on the total power outputted from the total power calculation means 161, and the powers outputted from the carrier power calculation means C0 to Cm.

As shown in another example of FIG. 14, the level difference detection means 116b includes: the carrier power calculation means E0 to Em for calculating, for a plurality of carriers, power values for the respective carriers from output signals sent from the carrier signal detection means 115; and the comparison part 171 for detecting the magnitude relationship of levels of the respective carriers based on outputs from the carrier power calculation means E0 to Em. For example, the level difference detection means 116b may further include a function of a weight multiplication means for multiplying a weight coefficient, determined by an output from the comparison part 171, by an output from the carrier power calculation means E0 to Em.

It should be noted that in the peak power suppression means, provided in the transmitter of the present embodiment and shown in FIG. 9 (and FIGS. 10 to 15), the following means are provided. A coefficient generation means is provided by the functions of the carrier signal detection means 115, level difference detection means 116, and filter coefficient storage parts F0 to Fm and multiplication parts G0 to Gm of the filter coefficient generation means 117 for generating filter coefficients in accordance with the levels of the respective carrier signals. A coefficient summing means is provided by the functions of the addition parts 181, 182 of the filter coefficient generation means 117 for summing the filter coefficients for all the carrier signals. A signal multiplication means is provided by the function of the complex multiplication means 122 for multiplying the summed result by the multi-carrier signal. A suppression rate generation means is provided by the functions of the power calculation means 118, peak power detection means 119 and peak power suppression rate calculation means 120 for generating a peak power suppression rate (i.e., an example of a peak level suppression rate). A suppression rate multiplication means is provided by the function of the multiplication means 121 for multiplying the multi-carrier signal by the peak power suppression rate. A suppression signal generation means is provided by the function of these for generating a peak power suppression signal (i.e., an example of a peak level suppression signal) And a suppression signal subtraction means is provided by the function of the subtraction means 123 for subtracting the peak power suppression signal from the multi-carrier signal.

Embodiment 5

A fifth embodiment of the present invention will be described below.

Figure 5:
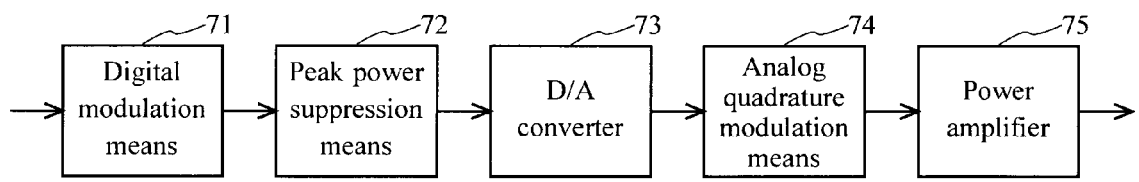
FIG. 5 is a diagram showing an exemplary configuration of a transmitting amplifier according to a fifth embodiment of the present invention.

FIG. 5 shows an exemplary configuration of a transmitting amplifier according to the fifth embodiment of the present invention.

The transmitting amplifier of the present embodiment includes: a digital modulation means 71; a peak power suppression means 72; a D/A (Digital to Analog) converter 73; an analog quadrature modulation means 74; and a power amplifier 75.

In this embodiment, as the peak power suppression means 72, various means may be used; for example, the one shown in FIG. 1, 2, 3 or 9 may be used.

An exemplary operation performed in the transmitting amplifier of the present embodiment will be described below.

For each carrier, the digital modulation means 71 performs, on an inputted base band signal, band limitation, upsampling to a desired sampling frequency, and digital quadrature modulation to a desired carrier frequency, and then outputs the result to the peak power suppression means 72.

The peak power suppression means 72 suppresses a peak power existing in the signal, inputted from the digital modulation means 71, to a threshold level, and then outputs the result to the D/A converter 73.

The D/A converter 73 converts the digital transmission signal, inputted from the peak power suppression means 72, to an analog signal, and then outputs the analog signal to the analog quadrature modulation means 74.

The analog quadrature modulation means 74 performs frequency conversion so as to convert the signal, inputted from the D/A converter 73, to a signal with a desired radio frequency (RF) band, and then outputs the result to the power amplifier 75.

The power amplifier 75 performs power amplification on the signal inputted from the analog quadrature modulation means 74, and outputs the power-amplified signal. This output signal is transmitted, for example, from an antenna (not shown) via radio.

Embodiment 6

In the present embodiment, as an example of the effect obtained with the use of the peak power suppression means as described in the foregoing first to fifth embodiments, there is shown that the unfavorable phenomenon, which has occurred in the peak power suppression means according to the conventional technology, does not occur using results of calculator simulation.

In the calculator simulation of the present embodiment, a transmission signal is transmitted by two-carrier transmission, and when the level between carriers is set in an unbalanced manner, a carrier f1 and a carrier f2 are set so that the carrier f1 is always at a higher level. Further, in the calculator simulation of the present embodiment, the carrier frequency was set at f1: −2.5 [MHz], and f2: +2.5 [MHz].

Furthermore, in the calculator simulation of the present embodiment, the peak power suppression means shown in FIG. 1 was used by way of example.

(i) Ameliorating Effects for Problem Example 1 of Conventional Technology

Figures 6, 7:
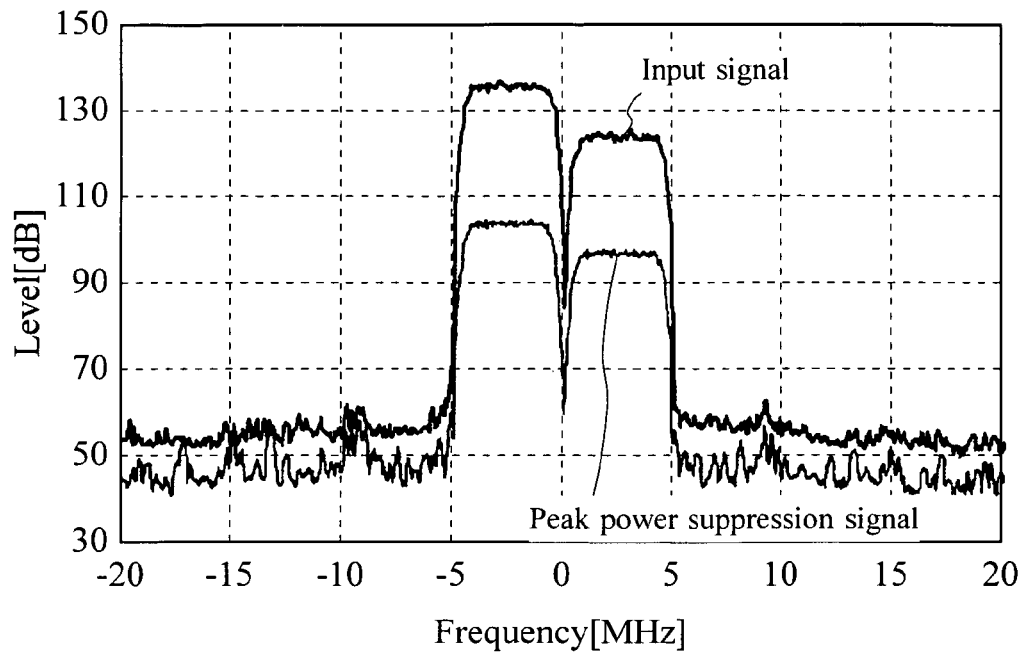
FIG. 6 is a graph showing examples of frequency spectra of a transmission signal (input signal) and a peak power suppression signal in a peak power suppression means according to one embodiment of the present invention in the case where a level difference is 12 dB.
FIG. 7 is a diagram showing examples of radio characteristics of output signals from a peak power suppression means according to one embodiment of the present invention.

FIG. 6 shows examples of frequency spectra of a transmission signal (i.e., an input signal of the peak power suppression means shown in FIG. 1) and a peak power suppression signal (i.e., an output signal from the adders 17, 18 in the peak power suppression means shown in FIG. 1) when the level difference between the carrier f1 and the carrier f2 is set at 12 dB. The horizontal axis represents frequency [MHz], while the vertical axis represents level [dB].

Figure 20:
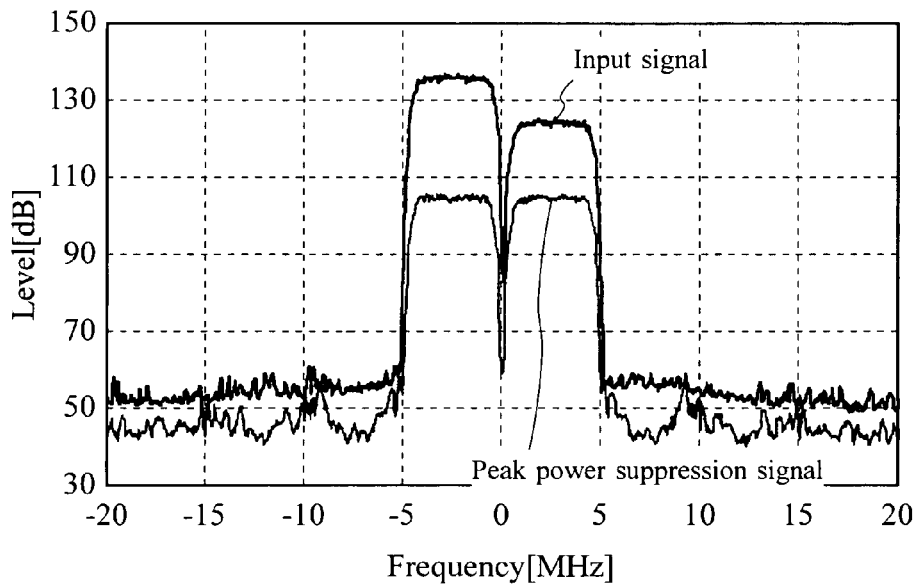
FIG. 20 is a graph showing examples of frequency spectra of a transmission signal (input signal) and a peak power suppression signal in the peak power suppression means according to the conventional technology in the case where a level difference is 12 dB.
Figures 21, 22:
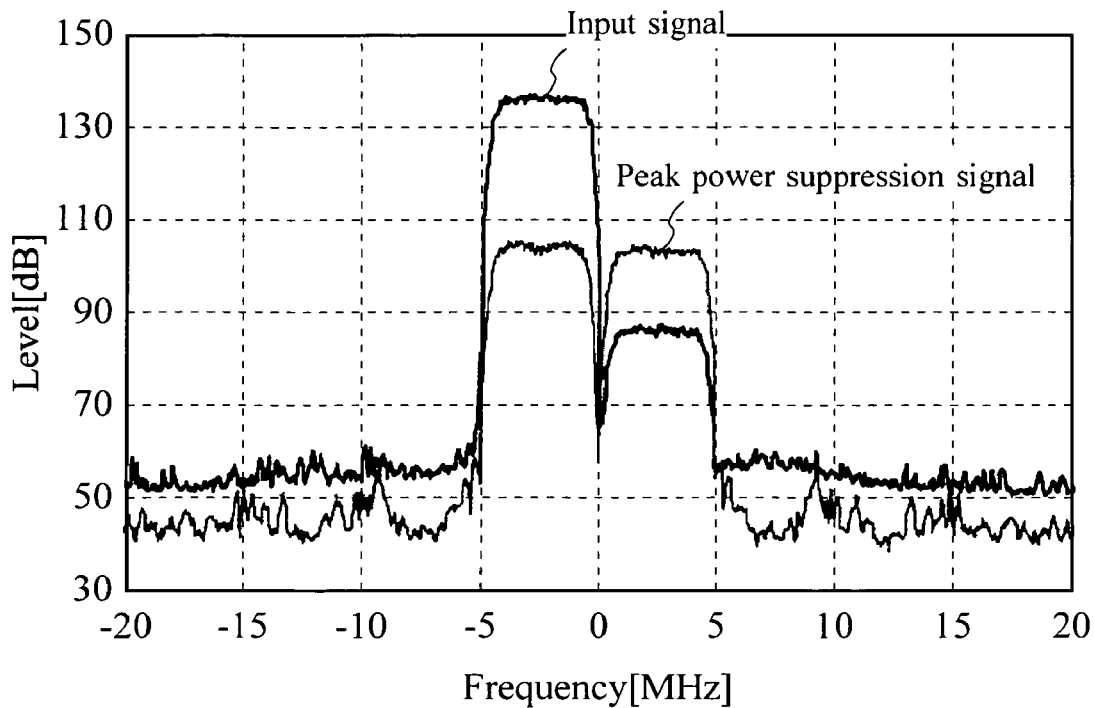
FIG. 21 is a graph showing examples of frequency spectra of a transmission signal (input signal) and a peak power suppression signal in the peak power suppression means according to the conventional technology in the case where a level difference is 50 dB.
FIG. 22 is a diagram showing examples of radio characteristics of output signals from the peak power suppression means according to the conventional technology.
Figure 23:
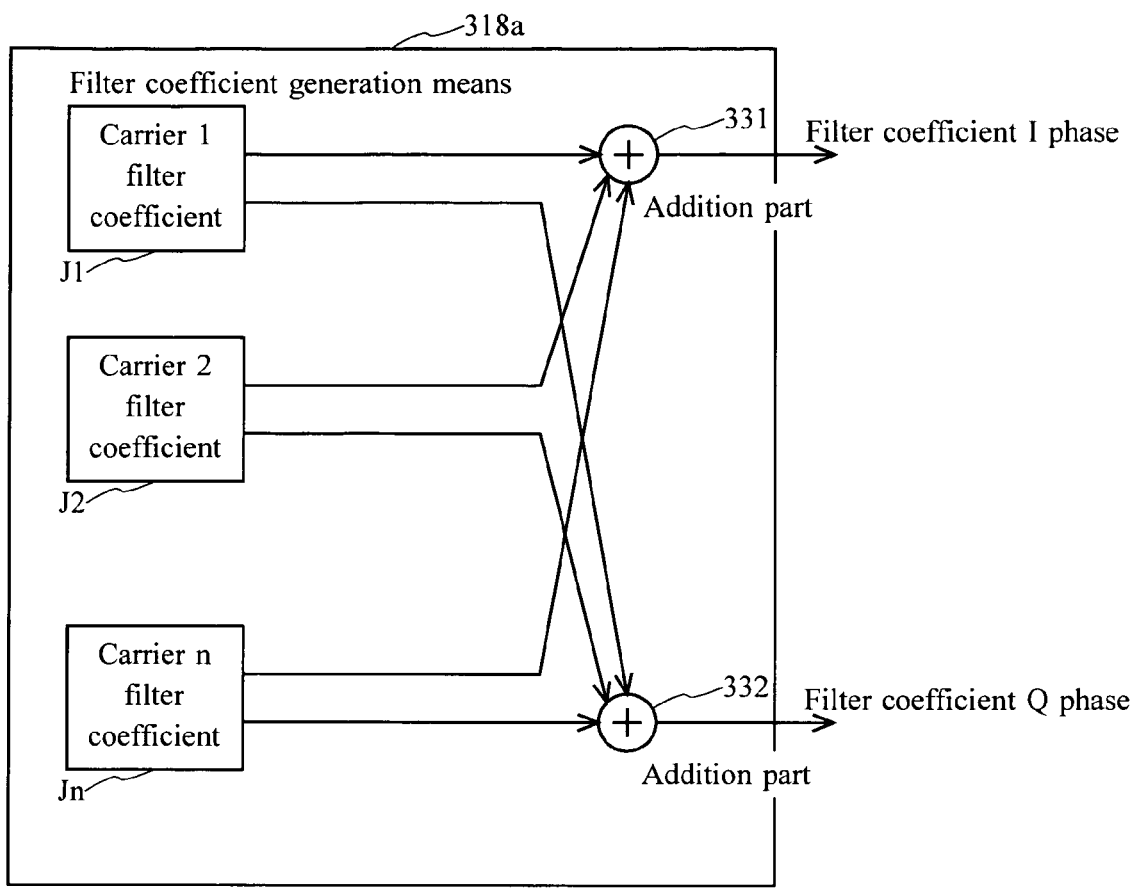
FIG. 23 is a diagram showing an exemplary configuration of a filter coefficient generation means according to the conventional technology.

According to the conventional technology, as shown in FIGS. 20 and 21, the peak power suppression signal was kept constant within the frequency bands of the carrier f1 and the carrier f2; however, in the present embodiment, it can be confirmed that, similarly to the transmission signal, the level of the peak power suppression signal within the band of the carrier f2 is reduced as compared with that of the peak power suppression signal within the band of the carrier f1.

A table in FIG. 7 shows a summary of EVM and PCDE characteristics with respect to output signals from the peak power suppression means of the present embodiment.

As signals serving as objects to be evaluated, like the signals evaluated as shown in the table of FIG. 22, there are provided signals of two patterns, characteristics of which are obtained when the carrier f1 and the carrier f2 are at an equal level, and when the level difference therebetween is 12 dB. In addition, in either signal pattern, level adjustment is performed so that the total transmission power is kept constant at max power at a preceding stage of the peak power suppression means, and furthermore, peak detection threshold values are set at an equal level, thus making the suppressed amount of the peak power equal.

According to the characteristics shown in the table of FIG. 7, it can be confirmed that characteristic degradation of a low level carrier, which has occurred in the characteristics of the conventional technology shown in the table of FIG. 22, does not occur.

(ii) Ameliorating Effects for Problem Example 2 of Conventional Technology

Figure 8:
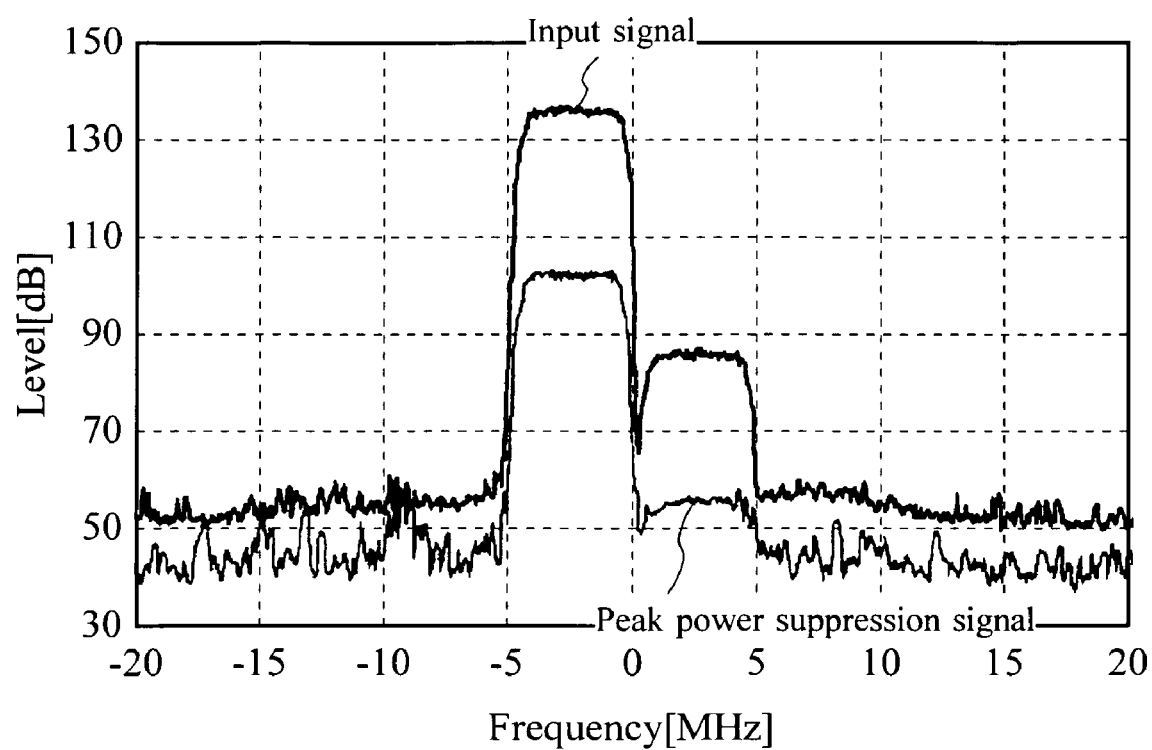
FIG. 8 is a graph showing examples of frequency spectra of a transmission signal (input signal) and a peak power suppression signal in a peak power suppression means according to one embodiment of the present invention in the case where a level difference is 50 dB.

FIG. 8 shows examples of frequency spectra of a transmission signal (i.e., an input signal of the peak power suppression means shown in FIG. 1) and a peak suppression signal (i.e., an output signal from the adders 17, 18 in the peak power suppression means shown in FIG. 1) when the level difference between the carrier f1 and the carrier f2 is set at 50 dB. The horizontal axis represents frequency [MHz], while the vertical axis represents level [dB].

In the present embodiment, it can be confirmed that the peak power suppression signal is located at a level lower than that of the transmission signal, and thus the problem, which has occurred in the conventional technology, does not occur.

As indicated by these results, the use of the peak power suppression means of the present embodiment can eliminate the problems such as ones occurred in the peak power suppression means according to the conventional technology, reduce the PAPR of the transmission signal while maintaining high signal quality, for example, and realize a high-efficiency power amplifier.

It should be noted that configurations of system, apparatus and the like according to the present invention are not necessarily limited to those described above, but various configurations may alternatively be used. Further, for example, the present invention may also be provided as a method or methodology for executing processes according to the present invention, a program for implementing such a method or methodology, and/or a recording medium for recording the program, and may also be provided as various systems and/or apparatuses.

Furthermore, the application field of the present invention is not necessarily limited to that described above, but the present invention is applicable to various fields.

Moreover, the present invention may use a configuration in which, in hardware resources including a processor, a memory and the like, for example, the processor executes a control program stored in a ROM (Read Only Memory), thus controlling various processes performed in the system and/or apparatus according to the present invention. Furthermore, each functional means for executing the processes, for example, may be configured as an independent hardware circuit.

Besides, the present invention may be grasped as a computer-readable recording medium such as a floppy (registered trademark) disk or a CD (Compact Disc)-ROM in which the above-mentioned control program is stored, or the program (in itself), and the control program may be inputted from the recording medium to a computer to allow a processor to execute the program, thus enabling the execution of the processes according to the present invention.

What is claimed is:

1. A transmitter for suppressing a peak level of a multi-carrier signal, the transmitter comprising:
    a peak level suppression signal generation means for generating a peak level suppression signal for a multi-carrier signal;
    an adjustment means for adjusting a level of the generated peak level suppression signal so as to be in accordance with levels of respective carriers constituting the multi-carrier signal; and
    a peak level suppression signal subtraction means for subtracting the level adjusted peak level suppression signal for each carrier constituting the multi-carrier signal from an input signal to generate a multi-carrier signal whose peak level has been suppressed.

2. The transmitter according to claim 1, wherein the peak level suppression signal generation means uses a filter coefficient whose frequency characteristic has been adjusted, thereby generating a peak level suppression signal whose frequency band has been controlled.

3. The transmitter according to claim 1, wherein the peak level suppression signal generation means comprises:
    a suppression rate generation means for generating, for an input multi-carrier signal, a signal indicative of a peak level suppression rate;
    a suppression rate multiplication means for multiplying, for each of the carriers constituting the input multi-carrier signal, IQ components of the respective carriers by the peak level suppression rate;
    a filter coefficient multiplication means for multiplying an output from the suppression rate multiplication means for each of the carriers by a filter coefficient having a frequency characteristic associated with frequency and band of each carrier, and for generating a peak level suppression signal whose frequency band has been controlled; and
    a summing means for summing, for all the carriers, outputs from the filter coefficient multiplication means for the respective carriers,
    wherein a result of these operations provides a peak level suppression signal.

4. The transmitter according to claim 1, wherein the peak level suppression signal generation means comprises:
    a filter coefficient gain adjustment means for multiplying a filter coefficient, having a frequency characteristic associated with frequency and band of each of the carriers constituting a multi-carrier signal, by a gain associated with a level of each carrier;
    a filter coefficient summing means for summing, for all the carriers, results obtained by the filter coefficient gain adjustment means;
    a suppression rate generation means for generating, for an input multi-carrier signal, a signal indicative of a peak level suppression rate;
    a suppression rate multiplication means for multiplying IQ components of the input multi-carrier signal by the peak level suppression rate; and
    a filter coefficient multiplication means for multiplying an output from the suppression rate multiplication means by the filter coefficient generated by the filter coefficient summing means, thereby generating a peak level suppression signal whose frequency band has been controlled, wherein a result of these operations provides a peak level suppression signal.

5. The transmitter according to claim 4, wherein the transmitter comprises a carrier level measurement means, and wherein the peak level suppression signal generation means performs gain adjustment of a filter coefficient based on a carrier level measured by the carrier level measurement means.

\* \* \* \* \*